May 27, 1958  W. G. MILLER, JR  2,836,731
GENERATION CONTROL SYSTEM
Filed Aug. 16, 1954  8 Sheets-Sheet 3

May 27, 1958 W. G. MILLER, JR 2,836,731
GENERATION CONTROL SYSTEM
Filed Aug. 16, 1954 8 Sheets-Sheet 6

May 27, 1958 — W. G. MILLER, JR — 2,836,731
GENERATION CONTROL SYSTEM
Filed Aug. 16, 1954 — 8 Sheets-Sheet 8

United States Patent Office 2,836,731
Patented May 27, 1958

2,836,731

GENERATION CONTROL SYSTEM

William G. Miller, Jr., Green Lane, Pa., assignor to Leeds and Northrup Company, Philadelphia, Pa., a corporation of Pennsylvania Application August 16, 1954, Serial No. 450,025

34 Claims. (Cl. 290—4)

This invention has for an object the provision of methods of and means for determining the loading of each of a plurality of interconnected generating sources as required to maintain a predetermined condition on the power distributing network while simultaneously maintaining a desired relationship among the generation levels of each source.

Further objects of this invention include the provision of means for loading interconnected generating stations so that the total cost of delivered power at the loads or load centers is a minimum and the provision of a reliable arrangement by means of which the generation of the respective power sources may be continuously maintained at values which yield minimum cost of operation of the system as a whole.

For a number of years utility engineers have paid particular attention to the relative costs of power generation at each of the power sources. Electrical generating units vary widely in their characteristics and generation costs. For example, in the case of steam stations, the type of fuel burned in the boilers may greatly change the cost factor of a station. A station which is equipped to burn either coal or gas may have available at times a low cost fuel. For example, there may from time to time be available excess gas which by reason of low cost will materially affect the load assigned to one or more of the stations. With lowered fuel cost the load can be increased.

If cost of generation is the only factor to be considered, then the lowest overall cost is obtained when all units are operating at points of equal slopes (equal incremental costs of generation) on the input-output curves where the input is taken in unit-cost-per hour of fuel, and the output as kilowatts. Since the input-output curves are not straight lines, there will be considerable variation in the slopes as the unit loads are changed. Numerous methods using schedules and curves to correlate the slopes of the characteristic curves of generating units at the required total system generation are used for this purpose. Such methods require a large number of schedules and curves to take care of the possible variations in the number of generators available for generation, variable fuel costs, etc. While material savings have been realized in practicing the foregoing methods, such systems have not taken into account transmission losses which may be large. With an interconnected system extending over a wide geographical area, it is not uncommon to transmit power over distances of several hundred miles.

The need to take into account transmission losses as well as the cost of power generation greatly complicates the overall problem. In an electrical power system consisting of interconnected power sources feeding power to load centers located throughout the system, it has been demonstrated that the incremental transmission losses (the change in total transmission losses for a unit change in source output) for each power source will in part depend upon the power supplied by each of the other sources. Because of this interdependence, when taking into account both the cost of generation and transmission losses it is necessary to solve many simultaneous equations.

In accordance with the present invention, there is utilized circuit means for obtaining an indication of the total change in generation, referred to the normal frequency of the sources, needed to meet load requirements and to maintain a predetermined condition (frequency) on the power distributing network. The indication of the needed total change in generation is utilized in conjunction with a computer or computing network to obtain values of generation change at normal frequency needed on each of the plurality of individual power sources to meet the needed total change in generation while maintaining a predetermined relation between those values, ideally the relation for minimum cost of delivered power. Stated differently, from the required total change in generation, there are automatically computed the changes in generation required at the several sources economically to meet the total required change in generation, together with means to vary the generation at the several sources in accordance with the generation levels computed therefor.

For purposes of the following description the term "generation level" is defined to mean the value of generation which would exist at the normal frequency, selected for example, as sixty cycles per second. It should be recognized that the measurements and computations to be discussed are subject to practical limitations as to accuracy or adjustments for the purpose of modifying the resulting control action. The term "generation level" is used to embrace values resulting from such limitations and adjustments.

I am informed and believe that an application for Letters Patent has been filed by Edwards Donald Early, on June 1, 1954, Serial No. 433,511, disclosing certain features of the present invention. The present invention is considered to be in part an improvement upon Fig. 1 of said Early application, only said system of Early's Fig. 1 having been available to me at the time of making my invention as embodied in my Figs. 1 and 3, Early's Fig. 2 also having been available to me at the time of making my invention as embodied in my Figs. 2 and 4–9. Though shown in my Fig. 4, I have not claimed herein the limit circuits shown therein. It is understood that claims specific to said limit circuits have been presented in said Early application.

For a more detailed development of the underlying theory, the many further objects and advantages of the invention arising from its application to power distributing systems of different types and configurations, and for the various forms which the invention may take, it will be helpful immediately to refer to the drawings, in which:

Fig. 1 diagrammatically illustrates one embodiment of the invention including a greatly simplified power distribution system to which the invention has been applied;

Figure 1:
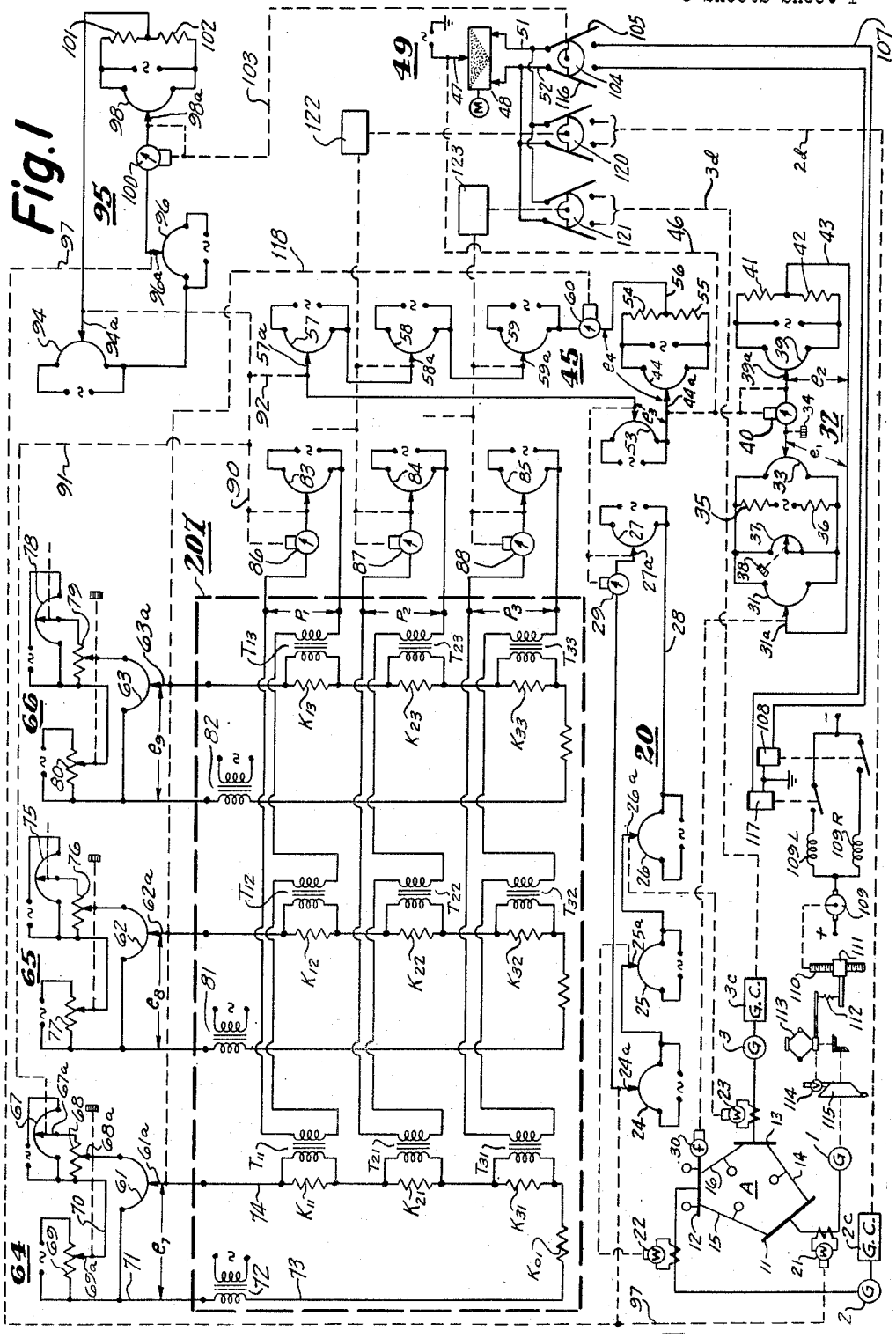

Referring to the drawings, the invention in one form has been shown as applied to a relatively simple power generating and distributing system including but three power sources, shown as generators 1, 2 and 3, respectively supplying power to their station busses 11, 12 and 13. The station busses are interconnected by transmission lines 14, 15 and 16 for the supply of power to loads, the load centers of which have been indicated by the small circles. It is to be understood that each generator and associated bus may also have local loads, two of them being illustrated for the bus 12.

As will be later explained, the area A, comprising the power sources 1-3, the transmission lines 14-16 interconnecting the station busses 11-13, may be connected by way of tie lines, not shown in Fig. 1, with other areas for exchange of power between them. It is to be further understood that the sources or generators 1-3 are representative of different power stations. In general there will be more than one generator at each station. The effort in Fig. 1 has been to simplify the system as much as possible to make easier a full and complete understanding of the basic principles underlying the invention and the manner in which they have been untilized in providing new methods and systems of controlling the load on the several power sources to produce delivery of power to the load centers in accordance with predetermined conditions, which in the example shown in Fig. 1, will be to achieve the minimum cost of delivered power.

An inspection of area A will reveal that power supplied to the load centers connected to transmission line 14 may come from any one or all of generators 1-3. If certain assumptions are made (which will later be referred to), the total system transmission loss can be expressed by the following equation.

$$P_L = \Sigma_m \Sigma_n P_m B_{mn} P_n \quad (1)$$

where $P_L$=total transmission loss
$P_m$=power output of source "$m$"
$P_n$=power output of source "$n$"
$B_{mn}$=constant dependent on transmission network, etc.

To the mathematician, Equation 1 states that the total transmission loss is a double summation involving only the powers in the sources $P_m$ and $P_n$ and the constants $B_{mn}$. If the system has ten sources, the $m$ index assumes all values of whole numbers from 1 to 10 and the $n$ index likewise will assume all values of whole numbers from 1 to 10.

The transmission loss equation for the system of Fig. 1, having but three power sources, would be written $$P_L = B_{11}P_1^2 + B_{22}P_2^2 + B_{33}P_3^2 + 2B_{12}P_1P_2 + 2B_{13}P_1P_3 + 2B_{23}P_2P_3 \quad (2)$$

In accordance with the present invention, use is made of the foregoing equations to determine the change in total transmission loss which will occur with given changes of power generation of the respective sources. With such changes in transmission loss ascertained and the incremental cost of generation known, the distribution of generation among the several sources for minimum cost of delivered power to the load centers can be determined. That distribution is the one which maintains the associated incremental costs of delivered power for each of the sources equal.

The effect of transmission loss on the incremental cost of power delivered from the power sources or generators 1-3 may be illustrated as follows. It will be assumed that an increase in generation at generator 1 may be accomplished at an incremental rate of 2 mills per kilowatt hour with an attendant incremental transmission loss of 10%, and it will be further assumed that the incremental rate at power source 2 will likewise be 2 mills per kilowatt hour but with an incremental transmission loss of 30%. Consequently the incremental cost of delivered power will be 2.22 mills for power source 1 and 2.86 mills for power source 2.

From the foregoing it will be seen that the incremental cost of generation, the incremental transmission loss and the incremental cost of delivered power means respectively the cost per unit change in generation, the change in total transmission loss with a unit change in generation and the change in delivered cost for a unit change in generation.

The foregoing states that the important factor is the rate of change, i. e., the slopes of the curves representing the respective variables, or mathematically, the first derivative of the applicable equations.

Referring again to Equations 1 and 2, the incremental transmission loss of a particular source can be determined by differentiating with respect to a particular source with all other sources held constant, i. e., using partial derivatives. Accordingly, taking the partial derivative of Equation 1, there is obtained the following equation:

$$\frac{\partial P_L}{\partial P_m} = 2\Sigma_n B_{mn} P_n \quad (3)$$

Taking the partial derivatives of Equation 2 for the three power sources 1-3:

$$\frac{\partial P_L}{\partial P_1} = 2B_{11}P_1 + 2B_{12}P_2 + 2B_{13}P_3 \quad (4)$$

$$\frac{\partial P_L}{\partial P_2} = 2B_{21}P_1 + 2B_{22}P_2 + 2B_{23}P_3 \quad (5)$$

$$\frac{\partial P_L}{\partial P_3} = 2B_{31}P_1 + 2B_{32}P_2 + 2B_{33}P_3 \quad (6)$$

Solving the above set of simultaneous equations for $P_1$, $P_2$ and $P_3$ there may be obtained the following set of equations:

$$P_1 = K_{11}\frac{\partial P_L}{\partial P_1} + K_{12}\frac{\partial P_L}{\partial P_2} + K_{13}\frac{\partial P_L}{\partial P_3} \quad (7)$$

$$P_2 = K_{21}\frac{\partial P_L}{\partial P_1} + K_{22}\frac{\partial P_L}{\partial P_2} + K_{23}\frac{\partial P_L}{\partial P_3} \quad (8)$$

$$P_3 = K_{31}\frac{\partial P_L}{\partial P_1} + K_{32}\frac{\partial P_L}{\partial P_2} + K_{33}\frac{\partial P_L}{\partial P_3} \quad (9)$$

For the general case, where more than three power sources are involved:

$$P_m = K_{m1}\frac{\partial P_L}{\partial P_1} + K_{m2}\frac{\partial P_L}{\partial P_2} + \cdots + K_{mn}\frac{\partial P_L}{\partial P_L} \quad (10)$$

The constants $K_{11}$, $K_{12}$ ... $K_{mn}$ are determined by the values of $B_{11}$, $B_{12}$ ... $B_{mn}$, the transformation from the latter to the former being readily obtained by well known mathematical operations applied to the simultaneous Equations 4-6.

An examination of each of the foregoing Equations 4 to 6 reveals that the incremental transmission loss for each of the power sources $P_1$-$P_3$ is expressed as a ratio rather than in kilowatts. It is also important to observe that if the incremental losses are found to be 0.1, by way of example, for the power source $P_1$, it does not mean that under the particular loading conditions 10% of the power is lost in transmission. It does mean, however, that 10% of the next unit of power generated will be lost in transmission to the load; and it also means that 10% of the preceding like unit of power was lost in transmission. The foregoing illustrates the meaning of incremental transmission loss. Though the total transmission losses for a given level of power may be only 5% or 6%, the incremental transmission loss for that given level may be as high as 10%.

Mathematically, it has been shown that the relation between fuel input and generator output can be expressed by the following relationship:

$$I = \text{input} = a + bP + cP^2 \qquad (11)$$

where input is expressed as $10^6$ B. t. u. per hour, $P$=kw. output, and $a$, $b$ and $c$ are constants.

The foregoing may be converted to incremental input by differentiating, viz:

$$\frac{dI}{dP} = b + 2cP \qquad (12)$$

To convert the above equation to incremental cost, it will be assumed that the cost of fuel per million B. t. u. is $f$. Accordingly, $$\frac{d(I \cdot f)}{dP} = \frac{dF}{dP} = (b + 2cP)f \qquad (13)$$

The foregoing will be rewritten for the general case:

$$\frac{dF_n}{dP_n} = g_n + h_n P_n \qquad (14)$$

where $g = bf$, and $h = 2cf$.

It can further be shown mathematically that the incremental cost of power delivered to the load by a power source $n$ which is defined as $(\lambda)$, may be expressed as follows:

$$\lambda_n = \frac{\frac{dF_n}{dP_n}}{1 - \frac{\partial P_L}{\partial P_n}} \qquad (15)$$

Solving the above equation for the incremental transmission loss, there is obtained:

$$\frac{\partial P_L}{\partial P_n} = 1 - \frac{\frac{dF_n}{dP_n}}{\lambda_n} \qquad (16)$$

and substituting Equation 14, the following is obtained:

$$\frac{\partial P_L}{\partial P_n} = 1 - \frac{g_n + h_n P_n}{\lambda_n} \qquad (17)$$

There will now be apparent from inspection of Equations 7 to 10 that the right-hand side of Equation 17 may be substituted in each of the above Equations 7 to 10 to produce the following equations:

$$P_1 = K_{11}\left(1 - \frac{g_1 + h_1 P_1}{\lambda_1}\right) + K_{12}\left(1 - \frac{g_2 + h_2 P_2}{\lambda_2}\right) + K_{13}\left(1 - \frac{g_3 + h_3 P_3}{\lambda_3}\right) \qquad (18)$$

$$P_2 = K_{21}\left(1 - \frac{g_1 + h_1 P_1}{\lambda_1}\right) + K_{22}\left(1 - \frac{g_2 + h_2 P_2}{\lambda_2}\right) + K_{23}\left(1 - \frac{g_3 + h_3 P_3}{\lambda_3}\right) \qquad (19)$$

$$P_3 = K_{31}\left(1 - \frac{g_1 + h_1 P_1}{\lambda_1}\right) + K_{32}\left(1 - \frac{g_2 + h_2 P_2}{\lambda_2}\right) + K_{33}\left(1 - \frac{g_3 + h_3 P_3}{\lambda_3}\right) \qquad (20)$$

$$P_m = K_{m1}\left(1 - \frac{g_1 + h_1 P_1}{\lambda_1}\right) + K_{m2}\left(1 - \frac{g_2 + h_2 P_2}{\lambda_2}\right) + \ldots + K_{mn}\left(1 - \frac{g_n + h_n P_n}{\lambda_n}\right) \qquad (21)$$

Having now demonstrated mathematically the manner in which there may be related the incremental costs of generating power, and the incremental transmission losses, all in terms of power generation of the respective sources, there will now be explained the manner in which there are produced changes in generation at each of the several sources to meet the area requirement of generation with equal incremental costs of delivered power as between the several sources.

Returning again to Fig. 1, a summation network 20 is provided to obtain an indication of the total actual generation. More particularly, there are provided power measuring instruments, preferably wattmeters, 21, 22 and 23, respectively responsive to the generation of each of sources 1–3. The wattmeters 21–23 respectively relatively adjust the positions of slidewire contacts 24a–26a relative to their slidewires 24–26. While the contacts in general will be shown adjustable, it is understood that in all cases the slidewires may be movable relative to stationary slidewire contacts.

Each of slidewires 24–26 is connected to a suitable source of supply indicated by conventional symbols as alternating current. Each slidewire develops in network 20 a voltage related to the position of its associated contact and representative of the power generation of the respective sources 1–3. The voltages introduced in the network 20 are cumulative, and the sum of said voltages is opposed by a voltage developed between slidewire contact 27a and conductor 28. Thus, the position of contact 27a movable under the control of a null detector 29 is at all times representative of total generation.

Though other means may be provided, the area requirement in terms of total desired change in generation level may be ascertained upon deviation of system frequency from a predetermined value. To this end, frequency-responsive meter 30 may be included in any line of area A. Though shown in station bus 12, it will ordinarily be included in one of the transmission lines 14–16.

The frequency meter 30 adjusts slidewire contact 31a relative to slidewire 31 in response to changes in frequency. The slidewire 31 is included in an area-requirement network 32. A part of that network includes a slidewire 33 having its contact manually adjustable as by knob 34 to a position representative of a predetermined normal frequency to be maintained on the system as a whole, and which for the usual commercial frequency will be 60 cycles per second. The left-hand portion of network 32 includes an alternating-current source of supply with resistors 35 and 36 in series therewith and also a rheostat 37 manually adjustable by knob 38 to provide the desired frequency bias, i. e., to predetermine the change in voltage $e_1$ for a given change in position of slidewire contact 31a.

The right-hand portion of network 32 includes a slidewire 39 with its contact 39a adjustable by a detector 40 responsive to the difference voltage between the voltages $e_1$ and $e_2$. The voltage $e_2$ is derived from slidewire 39 energized from an alternating-current source, there being included two equal resistors 41 and 42 between which connection from contact 31a is made by way of a conductor 43. The generation or area-requirement network 32 thus provides for adjustment of slidewire contact 39a by an amount representative of a desired total change in generation level. Such a change is required by the load change on the system which produces a frequency variation as detected by the frequency meter 30. It is here pointed out that when the change in generation level is sufficient to return the frequency to its selected value, i. e., to exactly 60 cycles per second, the slidewire contact 39a will be returned to its original positions.

Those skilled in the art will understand that prime movers associated with generators will be provided with governors, such a governor 113 being shown in Fig. 1 as controlling the operation of a steam valve 114 for the prime mover 115 illustrated as a turbine driving the generator 1. A change in load on area A will result in a change in speed of operation of each prime mover and associated generator. The governor 113 will respond to adjust the valve 114 in a direction to counteract the change in speed. For example, if the load on area A increases, there will be a decrease in the speed of operation of generator 1 with a concurrent decrease in the frequency of the alternating-current generated thereby. The action of the governor 113 in response to the decreased speed will be to open the steam valve 114 to supply additional steam to the turbine 115, thus to increase the output of generator 1 to counteract the decrease and to diminish the deviation of the frequency from its normal and predetermined value of 60 cycles per second.

For ease in understanding the present invention, the operation of the governor can be neglected. Disregarding the governor action, a given load change on area A will produce a known change in frequency. Thus the frequency meter 30 will adjust the slidewire contact 31a a predetermined amount. By proper setting of the rheostat 37, the output or voltage $e_1$ will be made representative of the changed generation required to meet the changed load at the normal frequency of 60 cycles per second.

If governor action be considered in conjunction with the foregoing, it will, by operation of the steam valve, at least partially compensate for the changed load, and any deficiency in the generation level as reflected by continued deviation of system frequency from 60 cycles per second will be reflected by an output $e_1$ from the system 32 representing the still-needed change in generation level to restore system frequency to 60 cycles per second.

As detector 40 responds to an unbalance of network 32 to adjust contact 39a, it concurrently moves a slidewire contact 44a of a slidewire 44 to develop in a balanceable network 45 a voltage representative in that network of the total change in generation level to be made at area A to restore the area to its selected condition of operation, i. e., for operation at exactly 60 cycles per second.

As explained in an article entitled "Area-Wide Generation Control" appearing in Electric Light and Power, June–July–August 1953, by Nathan Cohn, the area requirement represents the amount by which area generation must be changed for the area to correct its net-interchange of power and to do its share of frequency regulation. Such a definition is particularly applicable to a power system in which tie-lines are included, themselves representing generation sources. Though such a tie-line is not shown in Fig. 1, it is to be understood the invention is applicable to systems including tie-lines and also to systems where the area requirement may take into account a scheduled tie-line load and a scheduled system frequency. Also, the network 32 with additions as fully explained in Patent 2,688,728 issued to a co-employee of mine, James B. Carolus, on September 7, 1954, for "Methods and Arrangements for Measuring Scheduled Deviation," may provide frequency/time-error biased tie-line load, and integrated tie-line load error as functions in the area requirement measurement.

The detector 40 through mechanical connection 46 adjusts a contact 47 relative to a commutator 48 forming a "raise" and "lower" pulse generator. The commutator 48 with contact 47 in its mid-position does not produce any output signals. When contact 47 is moved to the right, it completes an electrical circuit through the unshaded conductive segment for application of "raise" impulses to a conductor 51, the lengths of which are determined by the extent of movement of contact 47 from its mid-position. Movement of contact 47 to the left applies "lower" impulses to a conductor 52 varying in length dependent upon the extent of movement of contact 47. While in practice other forms of pulse-producing apparatus may be used, the one chosen for illustration is simple and easily understood. The manner in which the "raise" impulses are applied in power stations will later be described.

Returning now to network 45 and the unbalance produced therein by the adjustment of contact 44a, it will be remembered that the network also includes a slidewire 53 with its contact adjustable by detector 29 to introduce into the network a voltage $e_3$ representative of the total actual generation at sources 1–3.

The voltage introduced into the network by slidewire 44 in conjunction with the two equal resistors 54 and 55 is represented by $e_4$. By taking the voltage $e_4$ from slidewire contact 44a and the conductor 56 connected to the junction point between equal resistors 54 and 55, it will be seen that the voltage $e_4$ will be in phase or out of phase with voltage $e_3$ depending upon whether contact 44a is moved to one side or the other from its mid-position on slidewire 44. The algebraic sum of voltages $e_3$ and $e_4$ in network 45 provides a resultant voltage representative of total desired generation for returning the frequency to 60 cycles per second. The resultant voltage is applied to a detector 60 by way of a circuit including slidewires 57, 58 and 59 which detector responds to adjust slidewire contacts 61a, 62a and 63a of slidewires 61, 62 and 63 respectively to modify voltages $e_7$, $e_8$ and $e_9$.

The manner in which the foregoing voltages are related to Equations 18 to 20 will be made clear after a discussion of the respective parts of the computing network as a whole of which the slidewires 61–63 are a part. Inasmuch as each of the incremental cost-of-generation computers 64, 65 and 66 are identical in circuitry, only the computer 64 for the power source 1 need be described in detail. It includes a slidewire 67 energized from a suitable source with its contact 67a adjustable by mechanical driving members 90 and 91 in accordance with a computed value of desired generation for source 1. A voltage-dividing resistor 68 has applied across it the voltage derived from slidewire 67 by its contact 67a. From an adjustable contact 68a there is applied to slidewire 61 the algebraic sum of the voltage from voltage-dividing resistor 68 and a voltage from a potentiometer 69, of value determined by the position of its contact 69a. In terms of Equation 14 the voltage between conductor 70 and contact 68a is representative of the last term of the equation, namely, $h_1 P_1$, where $P_1$ represents a computed value of desired generation. The voltage between contact 69a and conductor 71 has a magnitude representative of the term "$g_1$" of Equation 14. Thus, the algebraic sum of said voltages applied to slidewire 61 is representative of the incremental cost of generation at said computed value, i. e., $$\frac{dF_1}{dP_1}$$

Equation 16, previously referred to, may be rewritten as follows:

$$1-\frac{\partial P_L}{\partial P_n}=\frac{\frac{dF_n}{dP_n}}{\lambda_n} \qquad (22)$$

There has been explained the manner in which the voltage representative of $$\frac{dF_1}{dP_1}$$

has been derived and how it is applied to respective ends of slidewire 61. It will now be seen that the fractional part of that voltage as represented by $e_7$ is representative of the ratio $$\frac{dF_1}{dP_1}$$

all divided by $\lambda_1$, i. e.

$$\frac{\frac{dF_1}{dP_1}}{\lambda_1}$$

The position of contact 61a relative to slidewire 61 is representative of $\lambda_1$, the incremental cost of delivered power.

Since the voltage $e_7$ is equal to the right-hand side of Equation 22, it is also equal to the left-hand side of Equation 22, namely, $$1 - \frac{\partial P_L}{\partial P_1}$$

By providing a transformer 72 to produce by its secondary winding in series with the voltage $e_7$, a voltage equal to $-1$, the value of unity on the left side of Equation 22 disappears. Mathematically, when the negative value of unity is added to the left-hand side of Equation 22, obviously it must also be added to the right-hand side. Then by changing the signs throughout, Equation 16 is obtained, namely, $$\frac{\partial P_L}{\partial P_n} = 1 - \frac{\frac{dF_n}{dP_n}}{\lambda_n} \qquad (16)$$

Thus, by the provision of transformer 72 the voltage applied between conductors 73 and 74 has a magnitude representative of incremental transmission loss for power source 1, i. e., $$\frac{\partial P_L}{\partial P_1}$$

The voltage representative of $$\frac{\partial P_L}{\partial P_1}$$

the incremental transmission loss for power source 1, is applied to the remainder of the series-circuit including transformer 72 and conductors 73 and 74, a ballast resistor $K_{01}$ and resistors $K_{11}$, $K_{21}$ and $K_{31}$. Resistors $K_{11}$, $K_{21}$ and $K_{31}$ have values determined by the correspondingly identified coefficients of Equations 7 to 9 (and also Equations 18 to 20). More particularly, the potential difference across resistor $K_{11}$ will be representative of the product of the current flowing through that resistor and its resistance value. Since the current will be proportioned to the voltage across the circuit, it will be representative of $$\frac{\partial P_L}{\partial P_1}$$

the product then being representative of the first term of the right-hand side of Equation 7, namely, $$K_{11} \frac{\partial P_L}{\partial P_1}$$

The product of the current and the resistance in resistor $K_{21}$ produces the potential difference representative of the first term of the right-hand side of Equation 8, and the corresponding product for resistor $K_{31}$ is representative of the first term of the right-hand side of Equation 9.

Thus, the resistors $K_{11}$, $K_{21}$ and $K_{31}$ have values representative of the coefficients of the first column of terms of Equations 7 to 9 with the current flowing through them representative of incremental transmission losses for the source 1 at the existing computed value of desired generation for source 1.

For the source 2, a slidewire 75 in network 65, a voltage-dividing resistor 76 and a potentiometer 77 perform the same functions as described for the corresponding circuit elements of network 64. Similar circuit elements 78, 79 and 80 perform like functions in network 66 for power source 3. Transformers 81 and 82 perform functions in the second and third columns corresponding with those described for the transformer 72 for the first column. Thus, in the second column, there are respectively obtained the products corresponding with those of the second terms on the right-hand side of Equations 7 to 9, and in the third column there are obtained products representative of those of the last terms of said equations.

In order to obtain output voltages representative of desired levels of generation at sources 1–3, summing circuits are provided for each row. In the first summing circuit isolating transformers $T_{11}$, $T_{12}$ and $T_{13}$ have applied to their respective primary windings the potential differences across the resistors $K_{11}$, $K_{12}$ and $K_{13}$. The secondary windings of the transformers are connected in series to produce an output voltage across the output terminals representative of $P_1$, the desired level of generation, and thus represents a solution of Equation 7. Similar summing circuits are provided for the second and third rows to provide output voltages representative of the desired levels of generation $P_2$ and $P_3$ for sources 2 and 3 and, of course, represent solutions of Equations 8 and 9. Such output voltages labeled $P_1$, $P_2$ and $P_3$ are respectively opposed by potential differences derived from slidewires 83, 84 and 85 with the slidewire contacts thereof adjusted by detectors 86, 87 and 88.

If the output voltage $P_1$ changes, the detector 86 adjusts the slidewire contact to rebalance the summing circuit. Through mechanical connections 90 and 91, the contact 67a is moved relative to slidewire 67 to change the voltage applied to the voltage-dividing resistor 68. Thus, with a change in desired level of generation for source 1, the generation, $P_1$, of the cost Equation 14 is changed. Through a mechanical connection 92 from detector 86, the contact of slidewire 57 is moved to change the voltage introduced into network 45 by an amount related to the change of the computed generation value as measured by detector 86 in association with slidewire 83.

Detector 86 through the mechanical connection 90 adjusts the slidewire contact 94a of slidewire 94 to maintain in a generation-computing network 95 a voltage representative of the computed value of generation. In network 95 is another slidewire 96 adjusted through mechanical connection 97 by wattmeter 21 in accordance with actual generation of source 1. A balancing slidewire 98 and the conductor extending to the juncture of resistors 101 and 102 together with detector 100 complete the series loop of network 95.

Upon change in the algebraic sum of the voltages introduced by slidewires 94 and 96, detector 100 adjusts slidewire contact 98a to maintain network 95 in balance. Thus, if the computed generation differs from the actual generation, detector 100 will move contact 98a from its neutral or mid-position. Such a neutral position is established by the provision of the equal resistors 101 and 102 associated with the source of supply for slidewire 98 and the network connection to them. The detector 100 responds to an unbalance in one direction representative of a value of actual generation below that of the computed generation to operate through mechanical connection 103 a routing switch as by rotating a cam 104 to close "raise" contacts 105 for transmission of "raise" pulses by way of conductor 107 to the operating coil of a "raise" contactor 108, which thereupon closes to energize through motor winding 109R the motor 109 for rotation in a direction to increase the generation of source 1. As diagrammatically shown, this is accomplished by the rotation of a screw 110 for movement of a traveling nut 111 in a direction to increase the tension applied by a spring 112 on a governor 113 which is arranged to adjust a steam valve 114 for a turbine 115 provided to drive the generator comprising the power source 1.

If the actual generation is greater than that computed and as represented by the relative positions of the slidewire contacts 96a and 94a, then detector 100 rotates the cam 104 in the opposite direction to close the "lower" contacts 116 for transmission of "lower" pulses to effect energization of the operating coil of contactor 117 for energization of motor winding 109L for rotation of the motor in the opposite direction to decrease the tension on spring 112 for closure of valve 114 to decrease the generation.

With the above understanding of the various computing and associated balanceable networks, there will now be briefly described the operation of the system as a whole and the manner in which the generation at each of the sources is controlled for equality of incremental cost of delivered power.

It will be recalled that the frequency-responsive meter 30 will adjust slidewire contact 31a in one direction or the other, depending upon whether the frequency is lower than its selected value, thus indicating the need for increased generation, or whether that frequency be higher indicating the need for decreased generation. Assuming the frequency is lower, then the voltage $e_1$ differs from the voltage $e_2$ and detector 40 responds to rebalance the network 32 and at the same time to adjust slidewire contact 44a to unbalance network 45. Detector 60 responds to operate, through mechanical connection 118, each of slidewire contacts 61a, 62a and 63a to change the values of the voltages $e_7$, $e_8$ and $e_9$. Since these slidewire contacts are simultaneously adjusted, the elements performing that operation may be termed an equal $\lambda$ multiplier. The immediate result of changing each of voltages $e_7$–$e_9$ is to change the currents through each of the columns of the computing network. Thus, the output voltages for each of the summing circuits will be simultaneously changed. There will be immediate unbalance, and detectors 86–88 will respond. Detector 86 will operate through mechanical connection 90 immediately to unbalance the network 95 for immediate operation of cam 104 in the direction to close contacts 105. Thus, the motor 109 will be energized to increase the generation of source 1. Only the network 95 has been illustrated in detail, it being understood there will be one of them for each power source as shown by blocks 122 and 123.

While the governors provided for each prime mover can respond quite apart from the above-described system, it is here emphasized that the operation which has just been presented demonstrates that any change in frequency detected by the device 30 which through slidewire contact 31a produces operation of detector 40 immediately begins to produce a change in generation at each of the sources in a direction to compensate therefor.

It is to be emphasized that as soon as the equal $\lambda$ multiplier has functioned to produce the unbalance for operation of detectors 86, 87 and 88, each responds immediately to change in the computing networks 64–66 the settings of the contacts of slidewires 67, 75 and 78. Only the one mechanical connection 91 from detector 86 has been illustrated, it being understood that like mechanical connections are provided for each of the slidewire contacts for slidewires 75 and 78, fractional parts of such mechanical connections being shown. Thus, an indication of the deviation of a system condition, i. e., frequency, from a predetermined value initiates the computer to change the computed values of generation accordingly and thus effect operation of a change in generation of the sources in a direction to restore that condition to its predetermined value.

Viewing the operation somewhat differently, as soon as slidewire contact 44a in network 45 moves to indicate a positive area requirement in terms of the necessary change in generation level, detector 60 forming a part of the equal $\lambda$ multiplier moves in a direction representative of new and higher levels of generation for each of the sources.

Lambda, $\lambda$, has been defined as the incremental cost of delivered power, and as long as there is maintained equality of the costs of delivered power from each of the sources, it is known that the system as a whole is functioning with the greatest economy. Since slidewire contacts 61a, 62a and 63a of slidewires 61–63 are simultaneously adjusted, and their positions are representative of $\lambda_1$, $\lambda_2$ and $\lambda_3$, their equality of movement establishes in the network a change of voltages $e_7$–$e_9$ for the calculation of the desired generation values for given and equal values of $\lambda$. This states the important principle upon which the present invention is based.

Immediately upon change of the equal-$\lambda$ multiplier, new computed values of generation are represented by the voltages $P_1$–$P_3$. As soon as these voltages appear, detectors 86–88 send to the cost-computing networks 64–66 adjustments for introducing into that section of the computer changes in the values of desired generation to produce new computed values of incremental station cost. Such adjustments in said networks 64–66 produce modified values of the voltages $P_1$–$P_3$. This chain of events continues until detectors 60, 86–88 are balanced. To provide a proper sequence of operations the equal lambda multiplier is adjusted to operate at a slower rate than detectors 86–88.

Again referring to detector 60 in network 45, as long as there is unbalance, detector 60 will continue to operate to adjust the equal-$\lambda$ multiplier. As new values of generation are computed, however, detectors 86–88 adjust slidewire contacts 57a, 58a and 59a in network-balancing directions. As soon as the voltages introduced in network 45 by slidewires 57–59 produce a total voltage equal to the algebraic sum of $e_3$ and $e_4$, the detector 60 is brought to a balanced position, i. e., to standstill. When that occurs, the computed values of generation will have attained a total value desired for all of the sources.

While all of the foregoing operations are taking place, the wattmeters or instruments 21–23 are respectively adjusting slidewire contacts 24a–26a, these adjustments in network 20 corresponding with the changing values of actual generation.

Stated differently, as the generation controller for the source 1, including the motor 109, the governor spring 112 and governor 113, functions to change the opening of steam valve 114, the speed of the generator comprising source 1 is changed in a direction to decrease the deviation in system frequency from its predetermined normal value of 60 cycles per second. Accordingly, the frequency meter 30 responds to the decreased deviation in frequency to adjust contact 31a in a direction to return it to its illustrated neutral position. The reduction of voltage $e_1$ produces operation of detector 40 to reduce $e_2$ to maintain network 32 in balance. Operation of detector 40 reduces $e_4$. The voltage $e_3$ in network 45 is higher due to a new value of actual generation. The changes in $e_3$ and $e_4$ would tend to cancel each other. Meanwhile, however, new positions will be assumed by the slidewire contacts 57a–59a which will introduce voltages in network 45 so that when the frequency has returned to its normal value $e_4$ will have been reduced to zero and the voltage $e_3$ will be balanced by that introduced by the slidewire contacts 57a–59a. It will, of course, be understood that the blocks 2c and 3c represent the generation controls for the sources 2 and 3, and each includes the same apparatus as described in detail for the generation control for source 1, the broken lines 2d and 3d symbolically illustrating the circuits completed by the cams 120 and 121 of the circuit-controlling switches.

When contact 44a attains its mid-position, then the area requirement which initiated a change in generation will have been met by new computed values of generation then taken up by the respective power sources through the action of the pulse generator 49 at routing switch 104 and corresponding pulse-routing switches operated by cams 120 and 121.

Referring again to the computer 207 of Fig. 1, the resistance values for each of the resistors in the computer will, of course, be determined to correspond with the requirements of a particular application of the invention. Some of the equations forming the mathematical background for the present invention have for some years been known to those skilled in the art, but they have not been heretofore applied to systems similar to those forming the subject matter of the present invention, and they have not heretofore been applied to systems similar to those shown in said Early application. Equations 4 to 6 based upon the B-constant coefficients, are discussed in an article by Kirchmayer and McDaniel appearing in the "General Electric Review" for October 1951, pages 39–45. The procedures there outlined for the determination of the B-constants may be utilized for any particular power distribution system to which the invention is to be applied. The transformation of the B-constants of Equations 4 to 6 to the K-constants of Equations 7 to 10 is a routine mathematical operation which need not be set forth in detail. There may also be utilized other methods of determining the "B" or "K" constants including the use of calculator boards on which there will be reproduced system conditions for acquirement of adequate data for the determination of the needed constants and their transformation into resistance values of constant-representing magnitude for inclusion in the computing networks of the present invention.

As earlier emphasized, only three sources, 1, 2, and 3, are shown in Fig. 1 representing a power distribution system of somewhat less complexity than will ordinarily be encountered. As exemplary of the values of the "K" constants of Fig. 1, a set of them has been computed for an actual distribution network having but three sources. Thus, in the following table there are set forth the values of the "K" constants, it being understood that the resistors of Fig. 1, having the same reference characters as in the following table, have resistances representative of values appearing in the table:

| Constants | Source 1 | Source 2 | Source 3 |
| --- | --- | --- | --- |
| $K_{11}$ | 28.20313 | | |
| $K_{21}$ | 16.59992 | | |
| $K_{31}$ | 7.32416 | | |
| $K_{12}$ | | 16.59992 | |
| $K_{22}$ | | 35.47774 | |
| $K_{32}$ | | 7.01463 | |
| $K_{13}$ | | | 7.32416 |
| $K_{23}$ | | | 7.01463 |
| $K_{33}$ | | | 4.06116 |

Now that the operation of the system of Fig. 1 as a whole has been set forth, it is to be understood that my invention may be embodied in apparatus and systems of different character and that some features described in connection with Fig. 1 may be omitted and other features added, all within the scope of the appended claims. For example, the detectors 86–88 may, through their respective mechanical connections, be arranged to operate indicating instruments which provide continuous indications of computed values of desired generation for each of the power sources. With indicating instruments showing actual generation and desired generation, an operator can then manually adjust each generation control to bring the actual generation to equal the computed desired generation values. Even though this manual operation be utilized, the computing network continues to function to provide the necessary information by means of which the manual steps may be taken to maintain equal the incremental costs of delivered power at the several sources.

Where the system is fully automatic, as in Fig. 1, the electrical load on area A may attain such values that one of the power sources may reach the maximum permissable loading prior to the attainment of the computed value of desired generation for that particular source. In order to prevent operation of a power source above full load and yet to retain in the computing system the correct parameters for such full load operation, the features of Fig. 2 may be added to those of Fig. 1. Only the added components and certain of those of Fig. 1 used in connection therewith have been illustrated in Fig. 2, the remainder of Fig. 1 being represented symbolically by the block 150 labeled "See Fig. 1."

Figure 2:
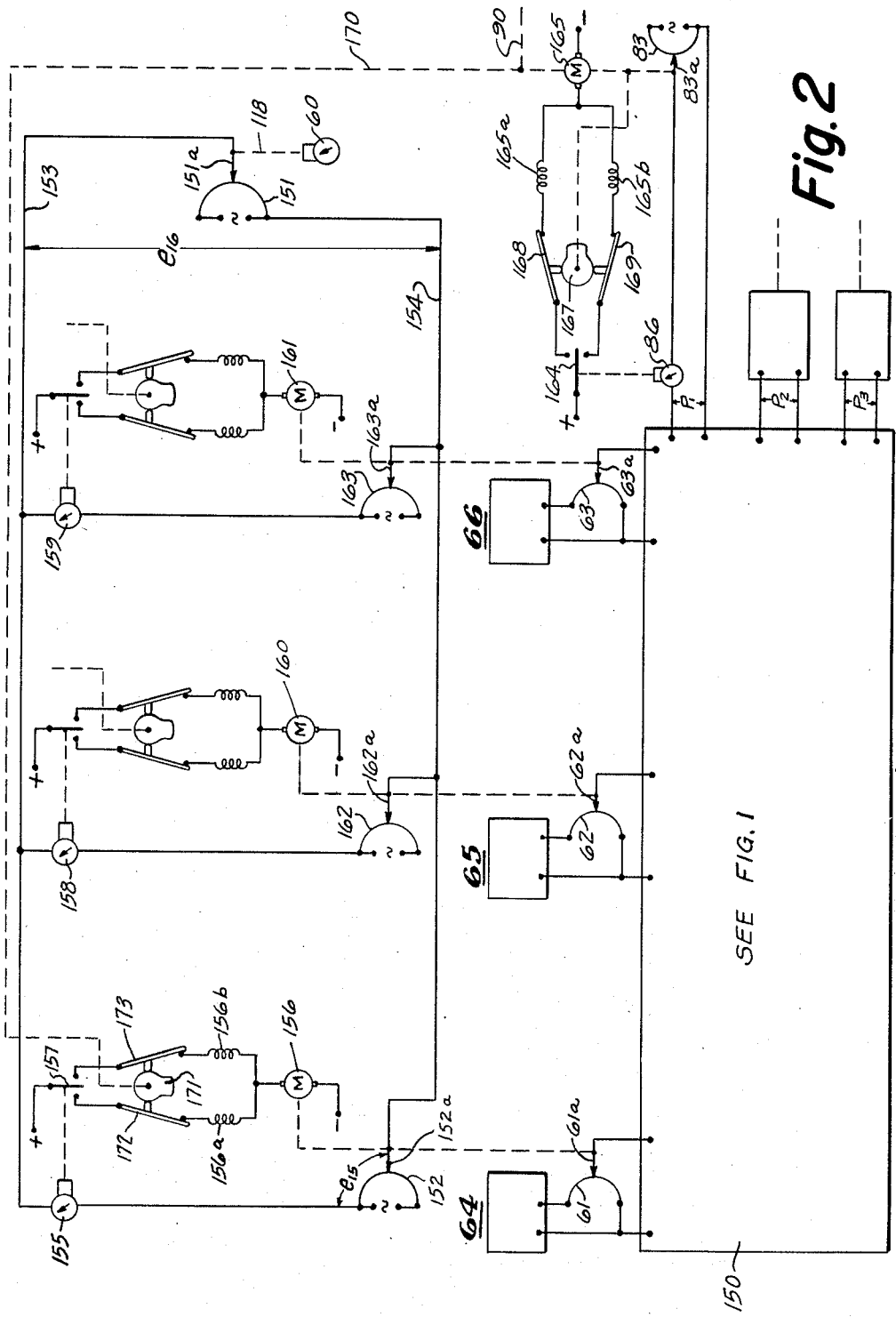
Fig. 2 is a wiring diagram of a modification of the invention in which a substantial part of Fig. 1 is illustrated in block diagram.

In the system of Fig. 1, it will be recalled that the detector 60 was used for the adjustment of the equal-λ multiplier. In Fig. 2 the detector 60 is shown mechanically connected at 118 for movement of slidewire contact 151a relative to a slidewire 151 energized from a suitable source of alternating current. The slidewire 151 and its associated contact 151a represents an equal-λ multiplier which through the circuits and devices now to be described produces equal adjustments of each of slidewire contacts 61a–63a respectively associated with the slidewires 61–63 forming parts of computer networks 64–66, each shown in block diagram in Fig. 2. It will be observed that upon movement of slidewire contact 151a there is developed a change in voltage $e_{16}$ between conductors 153 and 154. In one branch of the network a voltage $e_{15}$ is developed between slidewire contact 152a of the slidewire 152 which, in relation to a detector 155, opposes the voltage $e_{16}$. Accordingly, as $e_{16}$ changes, the detector 155 will respond to operate a switch 157 to energize a motor 156 through one or the other of field windings 156a and 156b for adjustment of slidewire contact 152a until the voltage $e_{15}$ is equal and opposite to the voltage $e_{16}$. The slidewire contact 61a is adjusted concurrently with contact 152a. In effect, the foregoing circuit provision comprise repeaters for slidewire contact 151a but include limit switch provisions which will be explained.

Other branches of the circuit include detectors 158 and 159 which similarly respond to a change in the voltage $e_{16}$ for adjustment by motors 160 and 161 of slidewire contacts 162a and 163a of slidewires 162 and 163. These motors concurrently adjust slidewire contacts 62a and 63a of computer networks 65 and 66. Thus, since motors 156, 160 and 161 are simultaneously energized with any change in voltage $e_{16}$, it will be seen that the slidewire 151 and its contact 151a may be considered the equal-λ multiplier.

It is to be remembered that from the computer of Fig. 1 there will be obtained voltages representative of desired generation and labeled in Figs. 1 and 2, $P_1$, $P_2$ and $P_3$. In Fig. 2 the voltage $P_1$ is shown applied to a series-circuit including the detector 86, contact 83a and a fractional part of slidewire 83. In Fig. 2 the detector 86 operates through a motor 165 having forward and reverse windings 165a and 165b to adjust slidewire contact 83a to a balancing position for the voltage representative of $P_1$. The motor 165 also drives a cam 167 arranged to open one or the other of limit switches 168 and 169 whenever the potential representative of generation $P_1$ reaches a predetermined maximum or minimum value. Thus, if the computed value of generation $P_1$ attains the full load value for the source 1, the cam 167 will open the limit contacts 168 to prevent further operation of motor 165 in the direction to increase generation regardless of operation of detector 86. With motor 165 at standstill, no further adjustment through mechanical connection 90 of slidewire contact 94a, Fig. 1, of computer 95 may take place. The motor 165 is also arranged to position through mechanical connection 170 a switch-operating cam 171 for the opening of switch contacts 172 and 173 to prevent energization of motor 156 upon attainment of generation levels at maximum and minimum predetermined values. Thus, when motor 165 is brought to standstill, so is motor 156, and the slidewire contacts 152a and 61a of Fig. 2 remain in fixed positions until the computed value of generation changes from one of said limits toward the other limit. When that occurs, the resulting movement of motor 165 and cams 167 and 171 cause the contacts which have been open to close, and the system again functions to restore to the computing networks computed values of generation within the regulating range of the power source 1.

Thus, the system of Fig. 2 in conjunction with the system of Fig. 1 not only maintains in the computer the factors representative of incremental cost of generation and incremental transmission losses, but also prevents change in generation of the source above full load and prevents adjustment of generation below a desired minimum.

In this connection, it will be remembered that in Fig. 1 detector 86 through mechanical connection 90 adjusts slidewire contact 94a in network 95 of Fig. 1. This adjustment establishes in that network the computed value of generation for source 1. That network through detector 100 continues to be effective to operate switch-cam 104 for pulse-directing purposes until contact 96a of slidewire 96 has been adjusted to correspond with actual generation of source 1 at full load. Thus, when the actual generation attains the full load value, network 95 will be in balance, and cam 104 will be returned to its illustrated position to prevent further application of "raise" pulses to source 1. Similar action occurs when $P_1$ reaches the minimum desired value.

When load conditions on area A change in the opposite direction, the computed values of the desired generation will likewise change. As soon as the computed values decrease below full load, the detector 100 will again function to position cam 104 to allow the application of "raise" pulses to the generation control if a generation increase is again required. In other words, detector 86 will function through switch 164 to close an opened limit switch (either 168 or 169 and either 172 or 173) as soon as $P_1$ attains a value for reversal of the unbalance voltage applied to detector 86.

In the equations which have heretofore been discussed, there have in general been included at least one example for the general case, thus suggesting that the present invention is not limited to the number of power sources to which it has been applied. In general, there must be the same number of columns and the same number of rows of computer elements as there are power sources; however, in some instances, there will be additional factors, which should be taken into account, such for example, large loads of a transient character and tie lines to other areas. If not treated separately, the large transient loads will disrupt the load pattern upon which the constants of the computer network are based and thereby introduce inaccuracies.

With regard to the tie lines which may have a power-flow in either direction, power-flows toward area A of Fig. 1 may be arbitrarily considered as generation, i. e., a positive source. When the power-flow is away from area A, the tie-line itself may be considered a source of negative generation.

Figure 3:
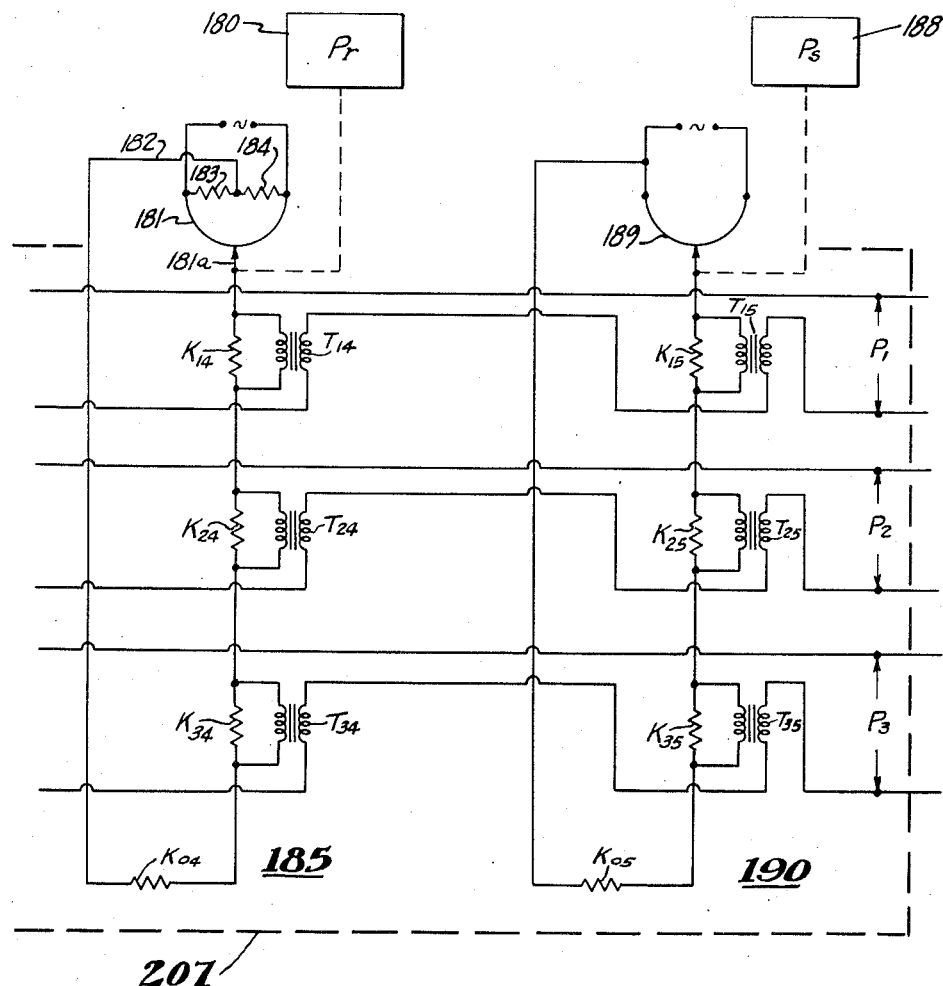
Fig. 3 is a fractional diagram illustrating the manner in which additional columns may be added to the computer of Fig. 1.

Conditions such as those mentioned may be included in the computer network of Fig. 1 in manner illustrated in Fig. 3. The block 189 represents a tie-line having a wattmeter or other suitable instrument for adjusting a slidewire contact 181a of a slidewire 181 energized from a suitable source of supply. The slidewire 181 forms a part of a fourth column of the computer network of Fig. 1, the voltage developed from the slidewire 181 and its contact 181a being applied by way of a conductor 182 connected at one end to the mid-point between two equal resistors 183 and 184. Thus, if contact 181a is moved in one direction, a voltage of one phase is applied to the fourth column 185, and if contact 181a is moved in the opposite direction from its mid-point, a voltage of opposite phase is applied to column 185. Current flowing through resistors $K_{14}$, $K_{24}$ and $K_{34}$ provides voltages representing products which are included in the summing circuit for the respective rows. Similarly, the block 188 represents load-measuring apparatus for the unusual load which is to be treated separately in the computing network and to provide through the media of resistors $K_{15}$, $K_{25}$ and $K_{35}$ other voltages representing products for the summing circuits which, as shown in Fig. 3, produce the computed values of generation $P_1$, $P_2$ and $P_3$. For the assumed unusual load condition, the connection will be representative of a negative source of power.

The addition of the fourth and fifth columns to the computer network means that transmission losses resulting from the flow of tie-line power and the flow of power to the unusual load, are taken into account in the network in determination of the computed values of generation to provide equal λ's, i. e., equality in the costs of delivered power from the several sources under control.

The manner in which additional columns may be included in the computer network 207 suggests that other columns may be provided to take into account additional corrective factors as may be desired. For example, if the computer outputs from the summing circuits are to be modified by constants, an additional column may be provided.

When the operation is for scheduled-tie-line operation, the scheduled values of tie-line power flow may be set by slidewire contact 181a, i. e. by its position relative to slidewire 181. This adjustment would then replace the watt-meter arrangement indicated by the block 180.

Again referring to Fig. 1, the sources 1, 2 and 3, though illustrated as single generators, may in fact comprise all of the generating units and prime movers located in a particular power generating station. Ordinarily there are a plurality of generating units in a station, and the cost of generating power of the same magnitude by each of the units will sometimes differ in marked degree. Under such circumstances, the system of Fig. 4 may be employed in connection with the modification of Figs. 1 and 2.

Figure 4:
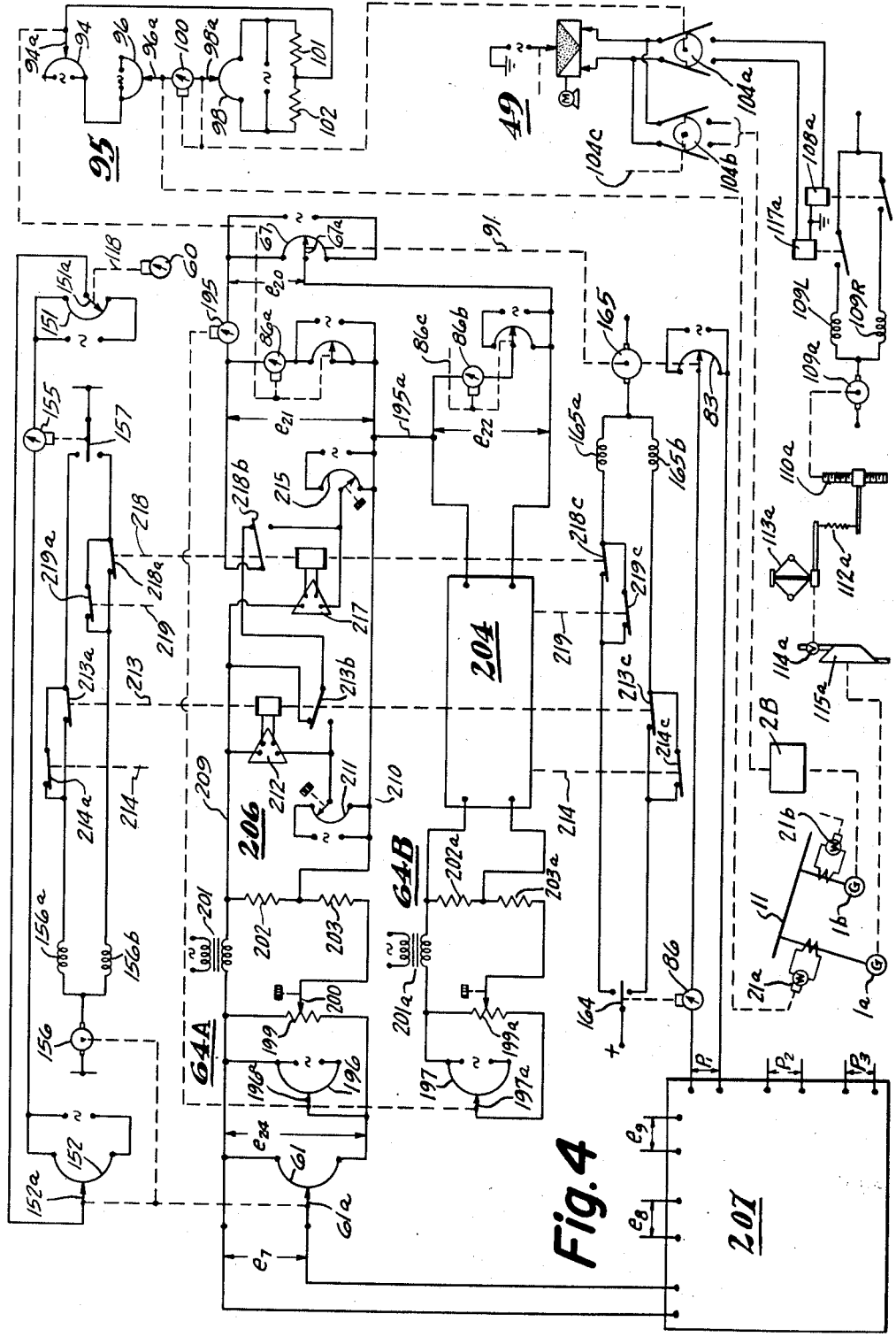
Fig. 4 is a wiring diagram illustrating a still further modification of the invention and including, partly in block diagram a substantial portion of Fig. 1.

In Fig. 4 generators 1a and 1b are to be taken as representative of a plurality of generators in a single station together forming a single source, such as the source 1 of Fig. 1. The generation of generator 1a is under the control of steam-regulating valve 114a associated with turbine 115a, the governor 113a, governor spring 112a, threaded rod 110a and motor 109a performing in the system of Fig. 4 in the same manner as correspondingly numbered parts (without the subscripts "a") of Fig. 1. It is to be understood that the generator 1b will have corresponding generation control components in Fig. 4 diagrammatically represented by the block 2B.

The computer 207 of Fig. 1 is shown in block diagram in Fig. 4, and it is here to be observed that the output voltage representative of $P_1$ from the first summing circuit will be representative of the total generation at the station including generators 1a and 1b. The input voltage $e_7$ to the first column of the computer 207, it will be recalled, was representative of the quantity $$1 - \frac{\partial P_L}{\partial P_1}$$

In the interest of simplicity, there have been illustrated in detail all of the circuit components associated with the generator 1a, indication of identical components for the source 1b being provided without detailed illustration of all of them.

Raise and lower pulses as produced by the pulse generator 49 are routed to the control relays 117a and 108a by the control cam 104a to change the generation of generator 1a as determined by the computing system and the needs of the power distributing system. A cam 104b performs like functions for the generator control 2B for the generator 1b. The cam 104a is positioned by detector 100 in network 95 having a slidewire contact 96a adjusted in accordance with actual generation of source 1a as by wattmeter 21a and a slidewire contact 94a adjusted by a detector 86a.

It is to be understood there will be a second generation computing network identical with the network 95 which will have a slidewire contact corresponding with contact 94a adjusted as by a detector 86b, the mechanical connection therefor being indicated at 86c. A detector in the computing network will operate through the mechanical connection 104c of the pulse-routing cam 104b.

In Fig. 4 there has been omitted the complete showing of the area A, the associated frequency-responsive device 30, the network 20 and the network 45, all of which form part of the system of Fig. 4. In Fig. 4 only the detector 60 of network 45 of Fig. 1 has been shown, the detector 60, through connection 118, adjusting slidewire contact 151a of slidewire 151. The detector 60 operates the slidewire contact 151a as the equal-λ multiplier in the same way as described for the modification of Fig. 2. In Fig. 2 the additional detectors 155, 158 and 159 repeat the movement of detector 60, thus providing the equal-λ operation so long as each power source is operating within its regulating range. For simplicity, the detectors 158 and 159 and their associated circuits have been omitted in Fig. 4, only the detector 155 being shown together with its associated motor-controlling switch 157, the motor 156 and the raise and lower windings 156a and 156b. The limit contacts in circuit with the respective motor windings differ from those of Fig. 2 and their function and purposes will later be explained.

With the foregoing description clearly in mind, it will be seen that when there is a change of a system condition, such as frequency, the detector 60 responds to operate a slidewire contact 151a which, through the operation of motor 156, adjusts contact 61a to vary the magnitude of the voltage $e_7$ applied to the first column of the computer network 207. At the same time there will be corresponding changes in the values of $e_8$ and $e_9$ as applied to the second and third columns of the computer network. Accordingly, a new value of generation $P_1$ will be computed, and detector 86 will respond to energize the motor 165 through one or the other of its windings to operate through mechanical connection 91 the slidewire contact 67a to change the value of the voltage $e_{20}$ representative of the computed generation $P_1$.

The newly computed value of generation $P_1$ as represented by the voltage $e_{20}$ is representative of the total generation for the station or source including generators 1a and 1b. For the newly computed value of generation for the station 1, it will be necessary to compute new values of generation for the generators 1a and 1b for their respective operations with the same incremental costs of generation and with the sum of their respective values of generation equal to that computed for the station. When the foregoing conditions have been met, the sum of the voltages $e_{21}$ and $e_{22}$ is equal and opposite to the voltage $e_{20}$, the three voltages being connected in a series circuit including a detector 195 and which, as is obvious from inspection of the circuit diagram, includes the conductor 195a.

With the newly computed value of $e_{20}$, it can be assumed that the sum of the existing values of $e_{21}$ and $e_{22}$ is not equal and opposite to the voltage $e_{20}$. Accordingly, the detector 195 responds to adjust simultaneously to adjust contacts 196a and 197a of slide-wires 196 and 197 respectively included in computing networks 64A and 64B. These networks are similar to the network 64 of Fig. 1. In Fig. 4 the slidewire 196 and its contact 196a develops from its own source of supply a voltage $e_{24}$ in network 64A corresponding with the incremental cost of generating power for the generator 1a, i. e., develops a voltage representative of $$\frac{dF_1}{dP_{1a}}$$

The voltage $e_{24}$ is modified by a voltage-dividing resistor 199 having a manually adjustable contact 200 which is set on resistor 199 in accordance with the fuel cost "$f$."

The output from the voltage-dividing resistor 199 has in circuit therewith a transformer 201 representing the constant $-b$ from the following equation:

$$P_{1a} = \frac{1}{2c}\left[\frac{\frac{dF_1}{dP_{1a}}}{f} - b\right] \quad (23)$$

which is another form of Equation 13.

The resultant voltage applied to the resistors 202 and 203 connected in series is representative of the solution of the numerator of the right-hand side of Equation 23. The voltage divider formed by resistors 202 and 203 is utilized to perform the division by the quantity 2c. Thus the voltage developed across resistor 202 represents a solution of Equation 23 and is representative of a computed value of generation for generator 1a. With the parts in the positions shown (particularly the contacts of the limit portion of the network 206), the voltage $e_{21}$ is equal to the voltage developed across resistor 202.

Similarly, corresponding parts in computer network 64B produce a voltage $e_{22}$ representative of a computed level of generation for the generator 1b. The circuit components in network 64B have the same reference characters as network 64A with added subscripts "a." If the sum of the computed values of generation $P_{1a}$ and $P_{1b}$ as represented by voltages $e_{21}$ and $e_{22}$ are not equal to $P_1$ as represented by the voltage $e_{20}$, then detector 195 continues to adjust slidewire contacts 196a and 197a until equality has been established. When the sum of the voltages $e_{21}$ and $e_{22}$ are equal and opposite to $e_{20}$, then there will have been computed the new levels of generation for generators 1a and 1b which will meet the changed requirements and which will at the same time produce operation of the respective generators with equal incremental cost of delivered power.

The limit circuits 204 and 206 are identical and only the circuit components of the limit circuit 206 have been shown in detail. Since the voltage $e_{21}$ across conductors 209 and 210 is representative of a computed level of generation for the generator 1a, the provision of a slidewire 211 connected to a source of supply may have its contact preset to develop in the input circuit of an amplifier 212 a voltage representative of the upper limit or full-load operation of generator 1a. The output of amplifier 212 is applied to the operating coil of a relay 213 shown in the energized position. Accordingly, the phase of the voltage applied to the input circuit of amplifier 212 is opposite to that of the voltage $e_{21}$. As the computed generation level of generator 1a rises, so will the magnitude of the voltage $e_{21}$. When the voltage across resistor 202 exceeds that introduced by slidewire 211, there will be a reversal of phase in the input circuit of the amplifier, and the coil of relay 213 will be deenergized to open raise limit contacts 213a and at the same time to open relay contacts 213c. The relay also operates its movable contact 213b to complete a circuit with the lower stationary contact thereby to apply to the detector 195 the value of the voltage introduced by the slidewire 211 which, of course, has a magnitude representative of full-load on generator 1a. In this manner as soon as the computed value of generation equals the full or maximum permissible load, the voltage $e_{21}$ remains fixed in magnitude until the demand on the system reverses to require a reduction in generation at generator 1a.

The opening of contacts 213a and 213c is ineffective since both contacts are respectively shunted by contacts 214a and 214c of a relay 214 operable by the limit network 204. Thus the effect so far is merely that of fixing at a predetermined value the voltage $e_{21}$.

A continuing change of area requirement in terms of generation produces continued operation of detector 60 and slidewire contact 151a. The detector 155 is effective to complete a motor circuit through contact 214a. Operation of the motor will further adjust slidewire contact 61a and the voltage $e_7$ for computation of a new level of generation $P_1$. The new level of generation $P_1$ will result in the operation of detector 86 to energize motor 165 as by way of shunting contact 214c for further adjustment of slidewire contact 67a to change the value of voltage $e_{20}$. Detector 195 responds with adjustment of slidewire contacts 196a and 197a. The adjustment of contact 196a will have no effect upon the voltage $e_{21}$. However, change in position of slidewire contact 197a changes the voltage $e_{22}$ to provide a new computed level of generation for generator 1b. Detector 86b responds to the changed voltage $e_{22}$ and through mechanical connection 86c operates through a network corresponding with network 95 to operate pulse-routing cam 104b to generation control 2b. Thus, while the voltage $e_{21}$ remains fixed, the voltage $e_{22}$ may continue to rise until the upper limit of generation for generator 1b has been attained. At that time the limit control network 204 will produce deenergization of relay 214 to open contacts 214a and 214c. Thereafter the generation level of the station including generators 1a and 1b cannot be further increased.

Returning now to the concurrent adjustment of slidewire contacts 196a and 197a by detector 195 after the voltage $e_{21}$ has been established by operation of relay 213, the following additional observations may be made. When the sum of the voltages $e_{21}$ and $e_{22}$ equals the voltage $e_{20}$, the following conditions obtain. The quantity unity minus the incremental transmission loss of the station comprising generators 1a and 1b will be equal to the incremental cost of generation at that station for both generators diivded by the incremental cost of delivered power. In equation form it may be stated:

$$1 - \frac{\partial P_L}{\partial P_1} = \frac{\frac{dF_1}{dP_1}}{\lambda_1} = \frac{\frac{dF_1}{dP_{1a}}}{\lambda_1} = \frac{\frac{dF_1}{dP_{1b}}}{\lambda_1} \quad (24)$$

The voltage $e_{24}$ is varied with change in position of slidewire contact 196a and with adjustment of slidewire contact 61a the voltage $e_7$ is changed so that it at all times is representative of the quantity on the left-hand side of Equation 24. Thus, even though the voltage $e_{21}$ remains fixed in value, the voltage $e_7$ is varied continuously to represent a solution of Equation 24 in terms of the left-hand side thereof; i. e., in terms of the quantity unity minus the incremental transmission loss for the station. The system continues to function to maintain the equality indicated as between the other terms of Equation 24 since $\lambda_1$ is varied by adjustment of slidewire contact 61a and by reason of the simultaneous adjustment of slidewire contacts 196a and 197a respectively representative of $$\frac{dF_1}{dP_{1a}}$$

and $$\frac{dF_1}{dP_{1b}}$$

While the voltage $e_{21}$ remains fixed in value, the adjustment of contact 196a so far as the voltages $e_{24}$ and $e_7$ are concerned is varied to maintain the equality indicated by Equation 24 between the aforementioned terms.

With the above understanding of the manner in which the limit circuit for the upper limit of generation of generator 1a operates, it will be understood that the limit circuit including the amplifier 217, the limit relay 218 and the slidewire 215 functions in substantially the same way for the lower generation-limit. The slidewire contact of slidewire 215 energized by a separate source of supply is set to a value for establishing in the input circuit of the amplifier a voltage corresponding with the desired minimum value of generation for generator 1a. For a number of reasons, it will be undesirable to reduce generation of a generator below a predetermined level, though from theoretical considerations it might be considered feasible to reduce generation to a zero value.

With the contact of slidewire 215 set to the selected minimum value of generation corresponding with standby operation of a boiler, when the voltage $e_{21}$ is decreased to a value for phase reversal of the voltage applied to the input circuit of amplifier 217, the relay 218 will be deenergized to open contacts 218a and 218c. The contact 218b will be moved to its lowermost contact to fix a value of voltage $e_{21}$ to equal that introduced into the input circuit of the amplifier by the slidewire 215. Since contacts 218a and 218c are respectively shunted by contacts 219a and 219c, the system continues to function to decrease generation on generator 1b until it reaches its lower limit. When that occurs, the shunting contacts 219a and 219c of relay 219 open to prevent further decrease of generation of generator 1b, but the system of Fig. 4 is in readiness to respond to an increase in generation requirements of the area or power-distributing system for increase of generation.

It will now be clear that the system of Fig. 4 may be applied to any number of generators in any one or all of the several stations, the simplified example of Fig. 4 being adequate for an understanding of the more complicated embodiments of the invention.

Referring now to Fig. 5, reference is again made to Equations 14 and 15. Substituting the right-hand side of Equation 14 for $$\frac{dFn}{dPn}$$

in Equation 16 and solving for $P_n$, there is obtained $$P_n = \frac{\lambda}{h_n}\left(1 - \frac{\partial P_L}{\partial P_m}\right) - K_n \quad (25)$$

where $$K_n = \frac{g_n}{h_n}$$

Figure 5:
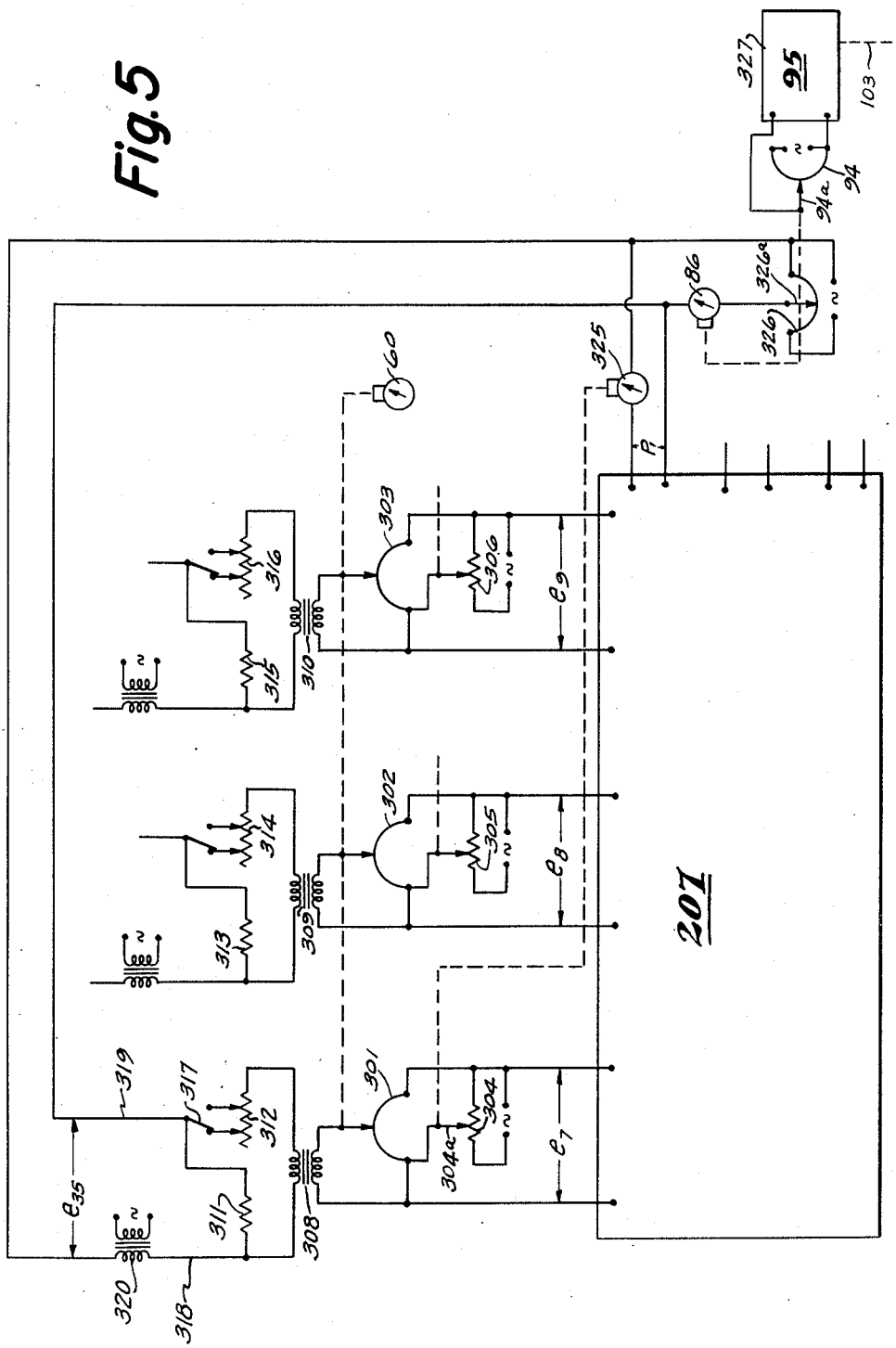
Fig. 5 is a wiring diagram of a still further modification of the invention.

In Fig. 5 the equal-$\lambda$ slidewires 301, 302 and 303 have their respective slidewire contacts simultaneously adjusted by the detector 60 in accordance with generation demand of area A in manner shown in Fig. 1. The respective slidewires 301–303 are energized from alternating-current sources through voltage-dividing resistors 304, 305 and 306 so that the voltages $e_7$, $e_3$ and $e_9$ applied to the matrix section of the computer network indicated by the block 207 respectively are representative of that part of Equation 25 within the parentheses, namely, unity minus the incremental transmission losses. There is derived from each of slidewires 301, 302 and 303 voltages applied to the primary windings of transformers 308, 309 and 310 which at the secondary windings thereof are representative of the incremental station costs, namely, $$\frac{dF_n}{dP_n}$$

In terms of Equations 14 and 25, by connecting across the respective secondaries pairs of series-connected resistors 311—312, 313—314 and 315—316, and taking the output voltages across one resistor and to an intermediate point of the other resistor, there is accomplished the division by $h_n$ of Equation 25. For example, the output voltage from transformer 308 is applied across the remote ends of resistors 311 and 312. Resistor 312 is connected in series with resistor 311 through a switch 317. The output voltage appearing between conductors 318 and 319 is but a fraction of the voltage applied across said resistors. With a change in cost of fuel or other factors, the switch 317 may be moved from one to the other of its positions to change said voltage in accordance with said factors. Since each of the normally stationary contacts of resistor 312 is connected thereto by adjustable connections, the extent of said change in voltage may be as required to correspond with all changes in cost of fuel.

The constant $(-K_n)$ (Equation 25) is represented by a voltage inserted in the line including conductor 318 as by a transformer 320 and is of such relative phase as to be subtractive with respect to the voltage from the voltage divider comprising resistors 311 and 312. Accordingly, the output voltage $e_{35}$ is representative of, and varies in the same manner as, the desired generation for the source 1 in order that the incremental cost of power delivered by source 1 to the load shall be equal to the incremental costs of power delivered to the load by the remaining sources.

The output voltage $P_1$ from the matrix portion of the calculator is representative of the desired generation of source 1. Any difference between voltage $e_{35}$ and voltage $P_1$ produces energization of a detector 325 for adjustment of contact 304a of voltage-divider 304. Such adjustment changes both of voltages $e_7$ and $e_{35}$ after modification by their respective computer networks with which they are associated. Such adjustments continue until voltages $e_{35}$ and $P_1$ are equal. When they are made equal, then the voltage $e_{35}$ is representative of the generation for source 1 corresponding with equality of the incremental cost of delivered power with those of the other sources, the objective to be attained in accordance with the present invention. The detector 86 of Fig. 5 adjusts contact 326a of slidewire 326 to rebalance the circuit across which the voltage $e_{35}$ is developed, and through a mechanical connection adjusts slidewire contact 94a of slidewire 94 forming a part of the network 95 shown in detail in Fig. 1 and by the block 327 in Fig. 5. The detector and mechanical connection 103 from network 95 operates the raise and lower directing cam to change the generation of source 1 in accordance with the computed generation requirements.

It is to be understood that for sources 2 and 3 the circuits and detectors will be duplicated, only one being shown in detail in Fig. 5.

From the modifications of Figs. 1 and 5 it will be seen that different voltages representing different parts of Equation 25 may be applied to the computing means to produce computed values of generation for each of the sources which will result in equal incremental costs of delivered power from such sources.

Further in accordance with the invention, the principles thereof may be applied to a system including a computing network based upon Equations 4, 5 and 6. Such an embodiment of the invention is disclosed in Fig. 6. The computing matrix 307 is of the same general configuration as the computing matrix 207 of Fig. 1. However, it will be observed that in Fig. 6 the summing circuits extend vertically rather than horizontally. In this case the values of the resistors correspond with the B-coefficients of Equations 4 to 6, the resistors of the matrix having subscripts corresponding with those of the B-coefficients of Equations 4 to 6.

Figure 6:
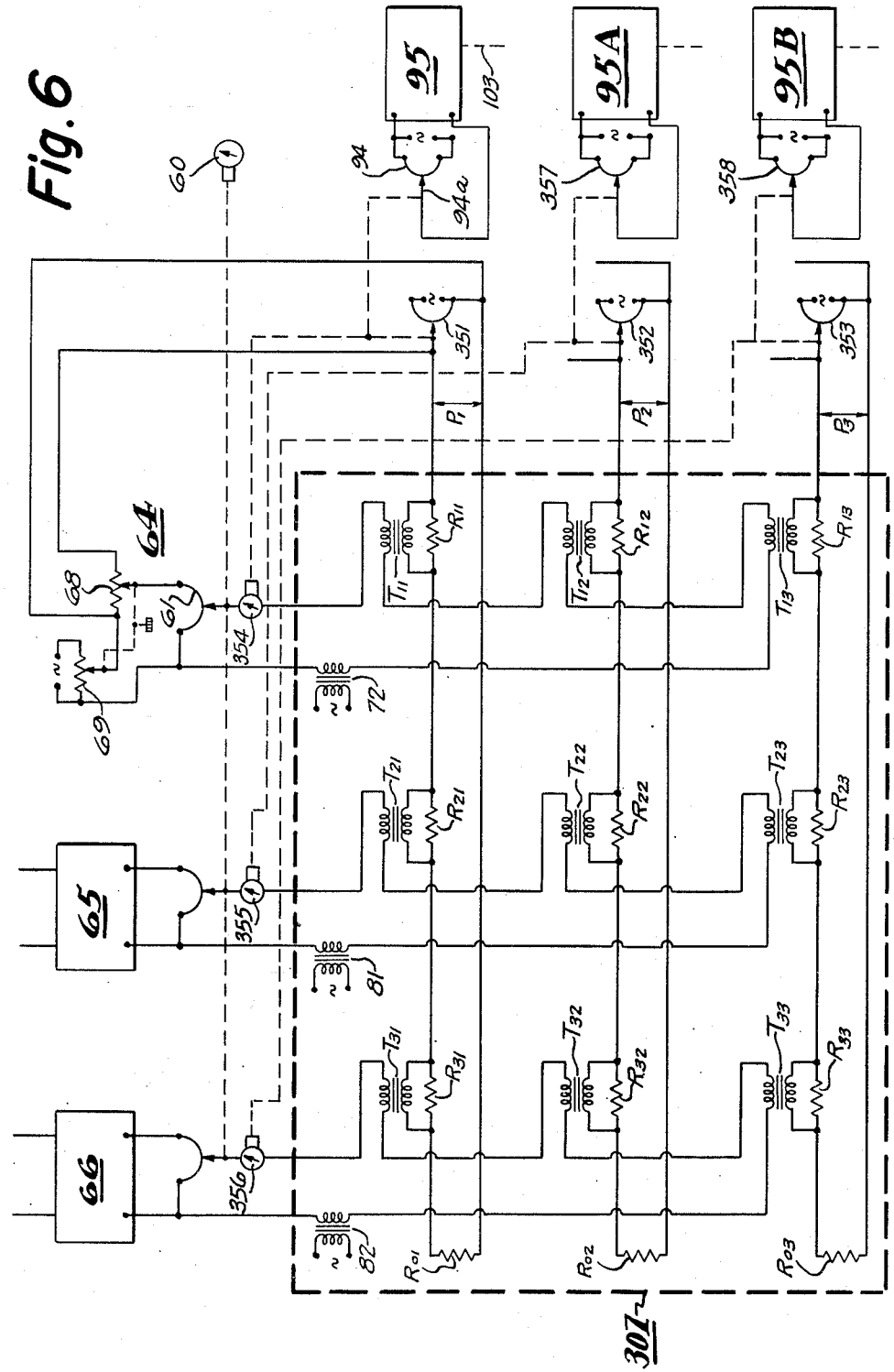
Fig. 6 is a wiring diagram showing a different way of using the computing means in control of distribution of generation for lowest incremental costs of delivered power.

In the modification of Fig. 6 the inputs to the computing matrix 307 comprise voltages representative of desired or computed values of generation for the several sources, these voltages in Fig. 6 being respectively labeled $P_1$, $P_2$ and $P_3$. The voltage $P_1$ is established by the position of the contact on slidewire 351 energized from a suitable source of supply. The position of the contact of slidewire 351 is determined by the operation of a detector 354 included in the vertically extending summing circuit of the computer 307.

The operations performed will be readily understood upon consideration of Equations 4 to 6 and Equations 14 and 22. For example, if Equation 22 be expanded by the use of Equations 4 and 14, for the source 1, the following equation may be written:

$$1-(2B_{11}P_1+2B_{12}P_2+2B_{13}P_3)=\frac{g_1+h_1P_1}{\lambda_1} \quad (26)$$

The voltages in the summing circuit introduced by transformers $T_{11}$, $T_{12}$ and $T_{13}$ are representative of the three products within the parenthesis on the left-hand side of Equation 26. Their sum is subtracted from the unity voltage introduced by transformer 72. Thus, the output voltage from the summing circuit has a value representative of the left-hand side of Equation 26.

The computing network 64 comprises the same elements and functions in the same manner as the corresponding network of Fig. 1. The voltage $P_1$ as derived from slidewire 351 is applied across the slidewire 68 and in conjunction with the separately excited slidewire 69 provides a voltage for the slidewire 61 representative of the numerator of the right-hand side of Equation 26. The $\lambda$-slidewire 61 performs the indicated division and thus applies to the detector 354 a voltage representing the solution of the right-hand side of the equation. If the two voltages, one from the summing circuit of matrix 307 and the other from the computing network 64, be unequal, the detector 354 responds to adjust the contact of slidewire 351 to change the computed level of generation $P_1$. This operation continues until the voltage representative of the left-hand side of the equation equals the voltage representative of the right-hand side of Equation 26. When the two voltages are equal, the computed generation $P_1$ for source 1 will then be at a level where the incremental cost of delivered power is equal to the incremental cost of delivered power from the sources 2 and 3.

It is believed the foregoing description presents the underlying theory and adequate details as to operation of the embodiment of Fig. 6. However, it is emphasized that the features of the embodiment of Fig. 1 not shown in Fig. 6 will be the same as in Fig. 1. For example, the detector 60 will be included in the network 45 of Fig. 1, and it will function in conjunction with network 20 in association with the respective meters, and with network 32 in manner already fully described.

Where in Fig. 1 the generation computing network 95 is shown as having a slidewire contact 94a adjusted as by a detector 86 in accordance with changes in the computed voltage $P_1$ representing computed values of generation for source 1, the detector 354 in Fig. 6 performs like functions in its adjustment of contact 94a. The network 95 in Fig. 6 has a mechanical drive 103 identical with that of Fig. 1 for controlling the pulse-directing cam for application of raise and lower pulses to the generation control for the source 1. For sources 2 and 3 there will be provided computer networks 65 and 66 functioning in identical manner with computing network 64, and additional generation computing networks 95A and 95B will be provided, each with mechanical drives for controlling the application of raise and lower pulses to the generation controls for sources 2 and 3.

Figure 7:
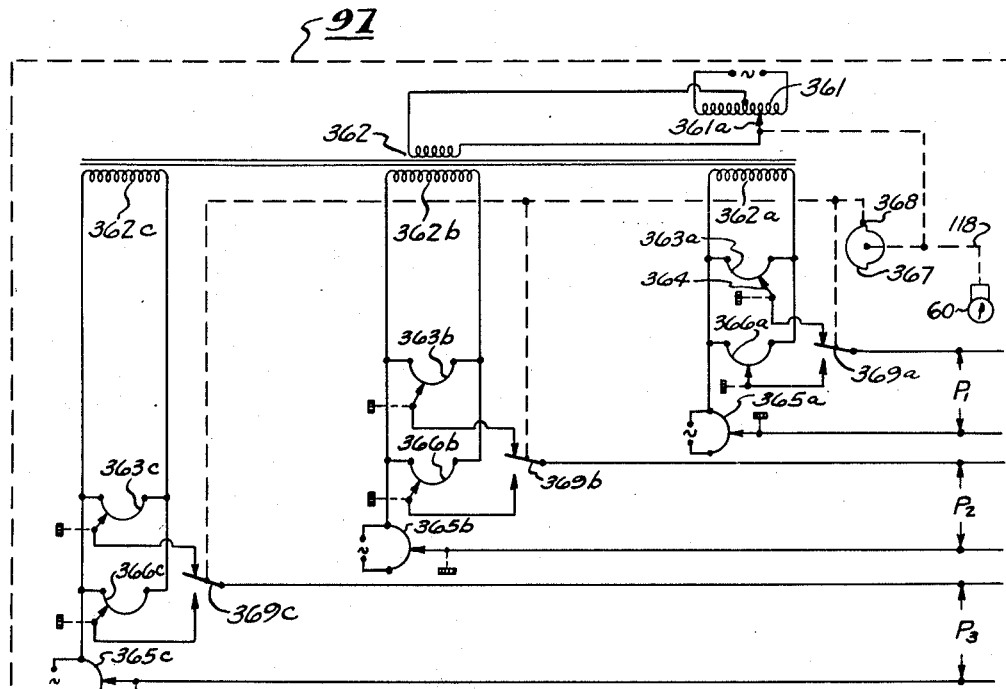
Fig. 7 is a wiring diagram of a computer differing in kind from that shown in Fig. 1, the circuits and mechanical connections of Fig. 7 being arranged to be superimposed on Fig. 1 for illustration of the complete system.

The modification of Fig. 7 illustrates a fractional part of the system of Fig. 1 where the computers 64, 65, 66 and 207 have been replaced by a different kind of a computing means. In Fig. 7 the computing means comprises an adjustable autotransformer 361 of the type available on the market under the name of "Variac," the transformer being energized from an alternating-current source of supply, with its adjustable contact 361a operable by a mechanical connection 118 extending to the detector 60 which, it will be recalled, is responsive to electrical unbalance of the network 45. Accordingly, when a load change occurs at area A, Fig. 1, the frequency meter 30 responds to produce an output from the generation requirement network 32 which through detector 40 operates contact 44a for development of a network-unbalancing voltage $e_4$. The detector 60 thereupon responds to move the transformer contact 361a, Fig. 7, to change the energization of the primary winding of a transformer 362 provided with a secondary winding for each of the power sources, more particularly, with secondary windings 362a–362c for the respective sources 1, 2 and 3 shown in Fig. 1. Thus, the output voltages from each of secondary windings are varied simultaneously whenever a desired change in total generation is indicated by reasons of operation of detector 60. Across transformer winding 362a is a voltage-dividing slidewire 363a having an adjustable contact 364 preset to predetermine the fractional part of the total generation requirement of the area to be carried by the source 1. Similar voltage-dividing slidewires 363b and 363c are connected across the secondary windings 362b and 362c.

By means of a slidewire 365a energized from a suitable source of supply, its associated contact may be preset to establish a predetermined base point, the purpose of which will later be explained. Thus, the output voltage labeled $P_1$ is representative of the generation to be developed at the source 1 and that output voltage is applied, Fig. 1, to the circuit including detector 86 and slidewire 83. The system of Fig. 1 beginning with the operation of detector 86 thereafter functions in the same way as has already been described with detector 86 adjusting slidewire contact 94a to a position representative of a desired value of generation for source 1, the detector 100 of network or circuit 95 then responding to route raise or lower pulses to the source 1 until the actual level of generation thereof corresponds with the newly computed value. Such correspondence is attained when through mechanical connection 97 contact 96a restores the balance of network 95 with contact 98a at its neutral position.

While the operations for source 1 are taking place, there may simultaneously occur similar operations for sources 2 and 3. Corresponding slidewires 365b and 365c perform like functions for those sources as for source 1.

The division of total load by the several sources, as indicated, will be satisfactory over a given range of loading. When the total load moves into a different range, however, more economical operation will be attained by a different division in the load as between the several sources. Accordingly, by providing slidewires 366a–366c and transferring the output to them from slidewires 363a–363c, the total load will then be divided in accordance with the setting of the slidewire contacts of each of slidewires 366a–366c. The foregoing transfer of connections is illustrated as being accomplished by the provision of a cam 367 driven by mechanical connection 118 and operating through a cam follower 368 to move the transfer switches 369a–369c from their illustrated positions into engagement with the lowermost stationary contacts. If desired, switches with more than two positions may be provided with additional slidewires inserted in the output circuits to predetermine the respective loadings of the sources. It is emphasized, however, that within a particular regulating range the several circuits including the secondary windings 362a–362c continue to perform load-dividing computations which are effective by means of the remaining features of the system as illustrated in Fig. 1 to predetermine the load of each of the sources to produce savings in the cost of delivered power. Such savings may be of substantial magnitude, though not necessarily the optimum savings which may be attained in accordance with other modifications of the invention. For a discussion of base point and two-segment control, reference is to be made to the above-referred to publication by Cohn, particularly Fig. 7 thereof.

Figure 8:
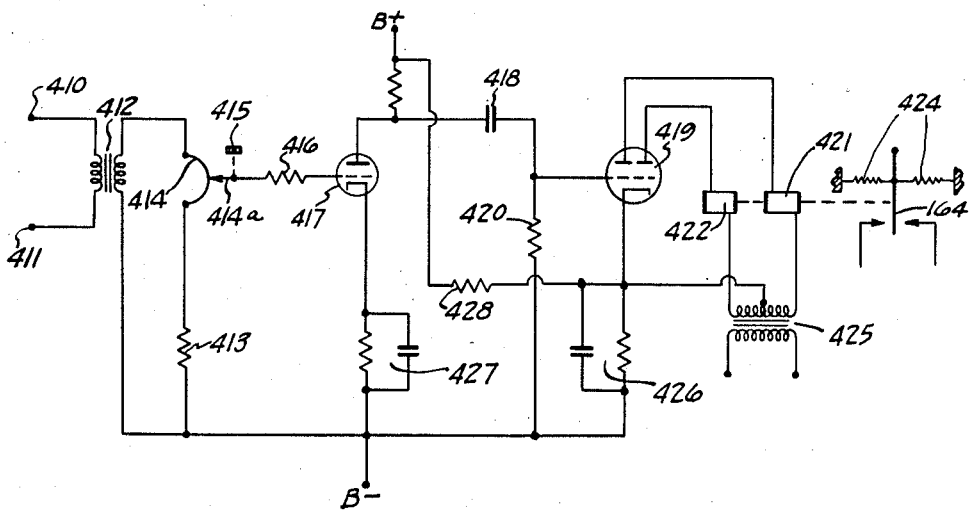
Fig. 8 is a wiring diagram of a typical high-impedance detector illustrative of those shown by symbols in certain embodiments of the invention.

The detectors throughout illustrated by conventional symbols, such as detectors 29, 40, 60, 86–88, 100, 195 and 354–356 are preferably of the high-impedance electronic type, such as disclosed in Williams Patents 2,113,164 and 2,367,746 respectively issued April 5, 1938, and January 23, 1945. The detectors of type disclosed in Fig. 8 are preferred for the detectors 86, 155, 158 and 159, although the previously mentioned type may be used. Similar detectors to those of Fig. 8 are shown in Fig. 4 as including the amplifiers 212, 217 and their associated relays 213 and 218.

Referring now to Fig. 8 there are illustrated input terminals 410 and 411 to which the primary winding of transformer 412 of the high-impedance type is connected. The secondary winding of transformer 412 is connected across resistor 413 and a slidewire 414, the movable contact 414a of which is adjustable by a knob 415. The voltage appearing across the lower part of slidewire 414 and resistor 413 is applied by way of a grid resistor 416 to the input circuit of vacuum tube 417. The input signal is amplified and applied by way of coupling capacitor 418 to the grids of a double triode 419. The grids for each triode have been illustrated as internally connected together and to a grid-leak resistor 420. The anodes are respectively connected to windings 421 and 422, one of which operates the movable contact 164 of the single-pole, double-throw switch against one stationary contact, and the other coil operates it against the other stationary contact. When neither coil is energized, centering spring 424 maintains the movable contact in an intermediate position and in spaced relation with both stationary contacts.

With the terminals 410 and 411 connected, for example in Fig. 2 in the first summing circuit in place of detector 86, and with the same source of alternating current applied to the primary winding of a plate supply transformer 425 of Fig. 8, as to slidewire 83, it will be seen that when zero potential difference appears at the input terminals there will be zero output from the tube 419. Suitable cathode-biasing means 427 is provided for the tube 417 and a fixed biasing means 426 is provided for tube 419. The fixed bias is produced by current flow through the resistor of the biasing means 426 by way of resistor 428 supplied from B+. However, when a potential difference appears, one of the triode sections of the tube 419 will be rendered conductive depending upon the phase relation between the input signal and the alternating current applied to the respective anodes. Thus, if the phase is in one direction, the left-hand triode will be rendered conductive to energize coil 421 to operate the switch 164 of Fig. 2 to complete a circuit with one of its contacts. Upon 180° reversal of phase, the other or right-hand section will become conductive for energization of coil 422 to operate the movable contact 164 against the other stationary contact. In this way the motor windings of motor 165 of Fig. 2 will be energized to drive the motor in one direction or the other and for purposes previously described.

The detector of Fig. 8 when used for the limit switch detectors will be operated with the switch contact 164 biased to one of its circuit-closing positions.

While in many of the modifications described above incremental transmission losses have been described as constituting an important factor to be taken into account, nevertheless, those skilled in the art are aware that in some power distribution systems transmission losses are relatively small and for practical purposes may be neglected. Such conditions exist in heavily populated, and in industrial, areas concentrated around or in the immediate vicinity of the power sources. Though the present invention is applicable to systems where transmission losses are an important factor, in its broader aspects it is also applicable to systems where for practical purposes transmission loss may be neglected in so far as entering into the determination of the most economical distribution of required generation amongst the several sources.

Figure 9:
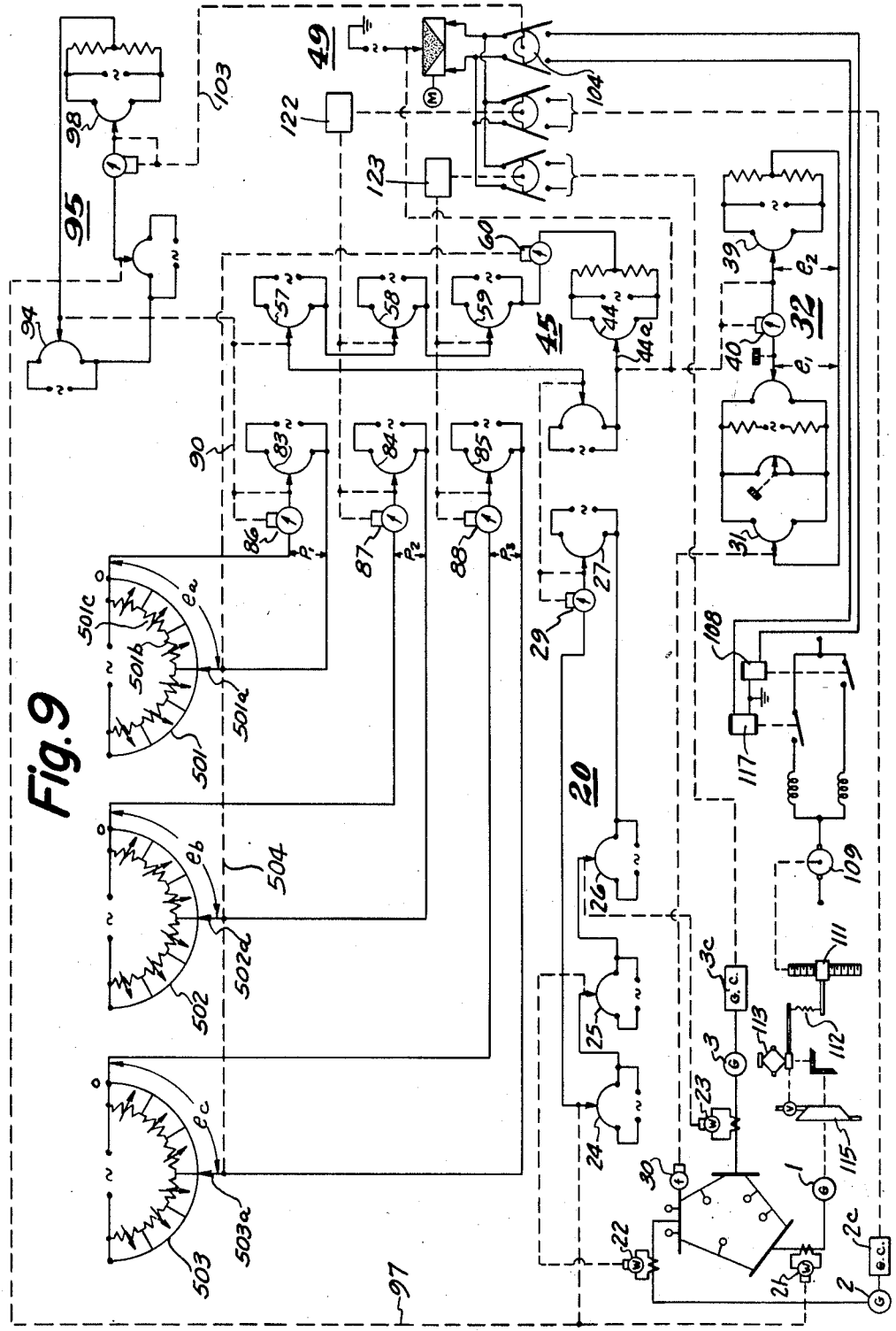
Fig. 9 is a wiring diagram schematically illustrating a further modification of the invention.

A further modification consistent with the foregoing is shown in Fig. 9. In this figure there are provided variable resistors shown in the form of slidewires 501, 502 and 503 which, in association with their respective alternating current sources and their adjustable shunting resistors, relate the incremental cost of generating power with the levels of generation at each source. More particularly, the potentiometer arrangement, including slidewire 501, provides a voltage output between slidewire contact 501a and the low or zero end of the potentiometer representative of the generation level $P_1$ for a given incremental cost of generation. If slidewire contact 501a is assumed to have moved a given distance toward the low end of the potentiometer it will then occupy a position corresponding with a lower incremental cost and the decreased voltage $e_a$ will be representative of a lower level of generation corresponding with the lower incremental cost. The arrangement is such that if the contact 501a be moved a second distance equal to that first assumed and in the same direction, the generation level will not necessarily be decreased by a like amount. This will be obvious if it be assumed that the first movement of contact 501a was just short of the right-hand end of shunting resistor 501b, while the second movement of the contact brings it over the segment shunted by resistor 501c which may have a value different from that of 501b.

These two resistors 501b and 501c are adjusted to provide a non-linear relationship between equi-distant changes in position of contact 501a and the resultant changes in the voltage $e_a$ thereby non-linearly to relate the computed level of generation and the incremental cost of generation for each source. By providing a common drive as indicated by the broken line 504 for the respective slidewire contacts 501a–503a, the voltages $e_a$, $e_b$, and $e_c$, representative of generation levels $P_1$, $P_2$ and $P_3$, will vary in such a manner as to maintain the positions of the contacts in a fixed relationship to represent equality of incremental costs of generation of the several sources 1, 2 and 3. Thus, while the operation of detector 60 in earlier modifications of the invention has been termed an equal lambda multiplier, in the modification of Fig. 9 detector 60 provides voltage outputs from the slidewires representative of the respective generation levels for equal incremental costs of generation at the several sources.

While the above explanation is considered adequate for an understanding of the operation of the system as a whole, the remaining components operating as fully described in connection with Fig. 1, a brief summary will now be set forth.

In response to a deviation of a condition of the system from a predetermined selected value (such as departure of frequency from a selected value of 60 cycles per second), the frequency meter 30 responds to adjust the contact of slidewire 31 connected in network 32. Detector 40 besides rebalancing network 32 adjusts slidewire contact 44a to unbalance network 45 for immediate operation of detector 60. This detector adjusts slidewire contacts 501a, 502a and 503a in one direction or the other, depending upon whether the frequency has changed below or above its selected value of 60 cycles. If the frequency is decreased, the slidewire contacts are moved in a direction to increase voltages $e_a$, $e_b$ and $e_c$. Thus, generation levels represented by $P_1$, $P_2$ and $P_3$ are respectively increased. While such increases may be by equal amounts when the incremental costs of generation change by equal amounts, the levels of generation represented by $P_1$, $P_2$ and $P_3$ will ordinarily change by differing amounts due to the more likely condition of non-linear and different relationships between incremental costs of generation and the associated levels of generation for the several sources.

The detector 60 continues to adjust contacts 501a, 502a and 503a until detectors 86, 87 and 88 have responded for adjustment of the respective slidewire contacts associated with slidewires 57, 58 and 59 to rebalance the network 45. It is again emphasized this network can be rebalanced before the newly computed levels of generation $P_1$, $P_2$ and $P_3$ have been established by the sources 1, 2 and 3. As soon as any of detectors 86–88 respond, they are respectively effective through networks 95, 122 and 123 to initiate flow of generation-controlling impulses to the generation controls including relays 108 and 117 for the source 1 and generation controls 2c and 3c for the sources 2 and 3.

The remainder of the operation of the modification of Fig. 9 is identical with that of Fig. 1 and hence, it need not be further summarized here.

Inasmuch as the potentiometer arrangements including the slidewires 501, 502 and 503 are utilized to relate levels of generation of each source with incremental costs of generation, it is to be understood that the slidewires 501–503 may themselves be non-linear to provide the needed relationship as dictated by the incremental cost characteristics of each source.

Another obvious equivalent may be provided by utilizing linear slidewires 501–503 with suitably shaped cams disposed between the common driving connection 504 and the movable contacts 501a, 502a and 503a so that for a given operation of detector 60 each of the slidewire contacts would move by different amounts to change the voltages $e_a$, $e_b$ and $e_c$ to new values corresponding with equal incremental costs of generation at each source for changed levels of generation.

With the foregoing modifications in mind it will now be obvious to those skilled in the art that networks of other and different kind may be provided, these and other equivalents of the modifications disclosed herein being within the scope of the present invention.

It can be seen that the balanceable electrical circuit 45 has as one of its adjustable circuit components slidewire 44 which serves to produce an electrical unbalance of the circuit in accordance with the required total change in the generation level which is needed to maintain a network condition, in this case a predetermined frequency. By providing detector 60 and the common drive 504 electrical signals $e_a$, $e_b$ and $e_c$ representative of the levels of generation for each of the said sources, corresponding to the same value of the incremental cost of generation as represented by the position of the common drive 504, can be obtained from the computer means which comprises slidewires 501–503. As a result of the production of the electrical signals representative of the changed levels of generation $P_1$, $P_2$ and $P_3$ the means operable in accordance with those signals are the several slidewires in circuit 45 operated respectively by detectors 86–88 which jointly restore the network 45 to balance when the sum of the changes in generation levels computed by said computer means is equal to the required total change in generation level.

In summary, in Fig. 1 the balanceable electrical circuit 45 has an area requirement means which includes as an adjustable component slidewire 44 for producing an electrical unbalance in the balanceable circuit 45 in accordance with the total change of generation of the sources needed to maintain the system condition, frequency, at a predetermined value as set by knob 34. In addition the balanceable circuit 45 includes a generation responsive means consisting of the detector 29 and the slidewire 53 which in conjunction with slidewire 44 produces in the balanceable circuit an output representative of the desired total generation of the sources 1, 2, 3. By providing detector 60 and the common drive 118 there is provided a means for simultaneously adjusting the adjustable means 61–63 shown as voltage varying circuit components in the form of slidewires.

Those circuit means 61–63 serve to interconnect a first and a second section of a computing means which is therefore operable in accordance with the unbalance of balanceable circuit 45. The first computing section such as 64 has a plurality of circuit components 67, 68 and 69 which relate the incremental cost of generation for the source 1 as represented by the potential across slidewire 61 with the level of generation as introduced by slidewide 67. The second section 207 has circuit components consisting in part of impedance elements $K_{11}$, $K_{21}$, and $K_{31}$ which are in a series circuit including conductors 73 and 74 and which serve to relate the incremental transmission loss for sources 1 as represented by the potential between conductors 73 and 74 to the generation levels of the sources. This is accomplished by developing, across the impedance elements by means of the current resulting from the voltage $e_7$ and the unity-representing potential introduced at transformer 72, potential differences representative of components of the transmission loss due to the computed level of generation at the sources. By algebraically summing the potential differences appearing in each of the series circuits as by the summing circuit which includes transformers $T_{11}$, $T_{12}$ and $T_{13}$, the output quantities $P_1$, $P_2$ and $P_3$ representing a computed level of generation for the sources is obtained.

The common drive 118 simultaneously adjusts the adjustable circuit means 61–63 simultaneously to change each of the levels of generation $P_1$, $P_2$ and $P_3$ computed for the sources. The computed levels of generation are so changed that voltages produced by slidewires 57, 58 and 59 which represent the first output quantities produced by the computing means serve to rebalance the electrical circuit 45 when their sum equals the desired total generation necessary to meet the load requirements and maintain the incremental cost of delivered power as between the sources in equality. While the adjustable circuit means 61–63 maintains equal the ratios between the incremental cost of generation for each of the sources as represented by voltages appearing across slidewires 61–63 and the quantities unity minus the incremental transmission losses as repersented by voltages $e_7$–$e_9$, other means are provided in the form of detectors 86–88, slidewires 83–85, 67, 75 and 78 for maintaining equal the values of generation as between each of the first computing section 64–66 and the second computing section 207.

In the networks 95, 122, and 123 there is provided a means for producing a second output quantity such as at slidewire 96 adjusted by wattmeter 21 representative of the actual generation. The detector 100 and the mechanical drive 103, its associated cam 104 as well as the additional pulse generator indicated at 49 and the generation control comprising relays 108 and 117 controlling the circuit of governor motor 109 provide the means responsive to both said quantities for changing the actual generation of each of the sources until each corresponds with its computed level of generation.

The elements which make up the system shown in Fig. 5 and the manner in which those elements cooperate to control the level of generation of the power sources are basically similar to the arrangement of Fig. 1. However, Fig. 5 differs in the representation of the quantity unity minus the incremental transmission loss for each of the sources by the adjustable potentials obtained from the potentiometer elements 304–306 of Fig. 5. In addition the means which maintains equal the values of generation, as between each of the first computing sections such as for example as the section including the components 311, 312, 317 and 320 which are associated with source 1 and the second computing section 207, comprises a balanceable system such as detector 325 in conjunction with the slidewire contact 304a in which adjustable potential $e_7$ is adjusted to maintain equality between values of generation as between said first and said second computing sections as represented by $e_{35}$ and $P_1$ respectively.

Now summarizing the operation of Fig. 6, the balanceable circuit and the first computing section as well as the other components have a similar relationship and operate in a similar fashion to produce the same results obtained by the system of Fig. 1. In Fig. 6, however, the value of generation for each of the sources, associated with the first computer sections 64–66 and with the second computer section 307, is represented by single potentials such as $P_1$ which is the potential output of slidewire 351. In addition the balanceable systems 354–356, which vary the potentials $P_1$, $P_2$ and $P_3$ to maintain the corresponding ratios between the incremental cost of generation and the quantity unity minus the incremental transmission loss for each of the sources as respectively represented by the voltages appearing on opposite sides of the detectors vary the potentials which represent the first output quantities, namely the voltages introduced by the slidewires 351, 352 and 353 for the sources 1, 2, and 3.

What is claimed is:

1. A system for controlling the levels of generation of a plurality of power sources interconnected to form a power distribution system in manner to maintain a system condition at a predetermined value while meeting the load requirements of said power system, comprising a balanceable electrical circuit having at least one adjustable circuit component for producing an electrical unbalance of said circuit in accordance with the required total change in generation level of said sources needed to maintain said system condition at its said predetermined value and to meet said load requirements, computing means operable in accordance with said unbalance of said circuit for producing output quantities respectively representative of a computed level of generation for each of said sources which will maintain the computed generation levels of all said sources in predetermined relationship and with the total change in said computed levels of generation matching said required total change in generation level of said sources, means for producing other quantities respectively representative of actual generation levels at each of said sources, means responsive to both said quantities for each said source for changing the actual generation level of each said source until it corresponds to its said computed level of generation, and means operable in accordance with said output quantities for rebalancing said electrical circuit when said computed levels of generation meet said load requirements and said required total change in generation level.

2. The combination set forth in claim 1 in which said computing means includes a series-circuit and an adjustable circuit component for each said source, each of said series-circuits including circuit elements for developing potential differences representative of components of transmission loss due to the computed level of generation of each said source, and means responsive to said electrical unbalance of said circuit for concurrently adjusting said adjustable components for production of said output quantities.

3. The combination set forth in claim 2 in which said last-named means comprises voltage-changing devices one for each said series-circuit and concurrently adjustable, and in which summing circuits are provided for said computing means in which circuits there are developed potential differences appearing across at least one of said elements in each of said series-circuits, the algebraic sums of said potential differences in said summing circuits representing said output quantities.

4. A system for controlling the levels of generation of a plurality of power sources interconnected to form a power distribution system in manner to maintain a system condition at a predetermined value, comprising a balanceable electrical circuit having at least one adjustable circuit component for producing an electrical unbalance of said circuit in accordance with the required total change in the generation level of said sources needed to maintain said network condition at its said predetermined value, means operable in accordance with said unbalance of said circuit for computing the desired generation levels at each of said individual sources required to maintain said generation levels in a predetermined relationship with their total generation at the changed level, said balanceable electrical network including adjustable circuit components, means for operating said last-named components in accordance with said computed generation levels for jointly restoring said network to balance, and means, one for each said source, for comparing actual generation of each said source with said computed value of desired generation for each said source for changing the actual generation of each said source until it corresponds with said computed generation for each said source.

5. A system for controlling the levels of generation of a plurality of power sources interconnected to form a power distribution system in manner to maintain a system condition at a predetermined value while meeting the load requirements of said power system, comprising a balanceable electrical circuit having at least one adjustable circuit component for producing an electrical unbalance of said circuit in accordance with the required total change in generation of said sources needed to maintain said system condition at its said predetermined value and to meet said load requirements, computing means including a plurality of series circuits each including a voltage-varying element therefor simultaneously operable in accordance with said unbalance of said circuit for producing output quantities respectively representative of a computed value of generation at each of said sources of magnitude representative of generation values of predetermined relationship and a total generation level change corresponding with said required change in said total generation level, means for producing other quantities representative of actual generation levels at each said source, means responsive to both said quantities for changing the actual generation of each said source until it corresponds to its said computed value of generation, and means operable in accordance with said quantities for rebalancing said electrical circuit when said computed values of generation meet the requirements of said required total change in generation level.

6. The combination set forth in claim 5 in which said series-circuits of said computing means includes impedance elements for developing from the voltages controlled by said voltage-varying elements potential differences representative of components of said computed values of generation of said sources, said computing means including summing circuits each including at least one impedance of each of said series-circuits.

7. A system for computing the distribution of generation required of a plurality of power sources interconnected to form a power distribution system to meet changing generation requirements of said system, comprising generation-responsive means energized in accordance with the generation of said power sources, area-requirement means adjustable with change in a condition of said system for producing an output representative of the change in total generation level required to restore said system condition to a predetermined value, circuit means operable in accordance with said area-requirement means and said generation-responsive means for producing an output representative of the desired total generation by said sources to restore said condition to its predetermined value, a balanceable circuit including said circuit means, computing means having a plurality of outputs, one for each of said sources, and having input means adjustable in accordance with the unbalance of said circuit, said computing means having elements operable in response to adjustment of said input means for producing at said plurality of outputs, signals having magnitudes bearing a predetermined relation one to the other and the sum of which is representative of said desired total generation, and means operable in accordance with said magnitudes of said signals for rebalancing said circuit.

8. A system for computing the distribution of generation required of a plurality of power sources interconnected to form a power distribution network to meet the generation requirement of said network, comprising a balanceable circuit unbalanced in accordance with the required total change in generation of said sources needed to maintain a predetermined network condition, means operable in accordance with the unbalance of said circuit for computing the individual changes in generation level of the respective sources which maintains equal the respective incremental costs of delivered power at the changed values of generation, the sum of the computed individual changes in generation level of said sources meeting the required total change in generation level, and circuit-rebalancing means operable in accordance with said computed changes in generation level to rebalance said circuit.

9. A system for computing the distribution of generation required of a plurality of power sources interconnected to form a power distribution system to meet changing generation requirements of said system, comprising a balanceable circuit unbalanced in accordance with the required total change in generation level of said sources needed to maintain a predetermined system condition, computing means operable in accordance with unbalance of said circuit for computing individual changes in generation level of the respective sources which maintains equal the respective incremental costs of delivered power at their changed levels of generation with the sum of said computed individual changes in generation level of said sources meeting said required total change in generation level, and means operable in accordance with said computed changes in generation level for rebalancing said circuit.

10. A system for computing the distribution of generation required of a plurality of sources interconnected to form a power distribution system to meet changing generation requirements of said system, comprising generation-responsive means energized in accordance with the generation of said power sources, area-requirement means adjustable with change in a condition of said system for producing an output representative of the change in total generation level required to restore said system condition to a predetermined value, circuit means adjustable in accordance with total generation of said sources, circuit means adjustable in accordance with the output of said area-requirement means, a balanceable circuit including said circuit means and including addition circuit elements respectively adjustable in accordance with computed values of generation, computing means having a plurality of outputs, one for each of said sources, and having a plurality of inputs, one for each of said sources, each of said inputs including an adjustable circuit component, means responsive to unbalance of said balanceable circuit for simultaneously adjusting said circuit components of said computer inputs for varying said outputs to maintain a relationship one to the other for equal incremental cost of delivered power, the sum of said outputs being representative of said desired total generation, and means operable with changes in said outputs for adjusting said circuit elements in a direction to rebalance said circuit.

11. A system for computing the distribution of generation required of a plurality of sources interconnected to form a power distribution system to meet changing generation requirements of said network, comprising generation-responsive means energized in accordance with the generation of said power sources, area-requirement means adjustable with change in a condition of said system for producing an output representative of the change in total generation level required to restore said system condition to a predetermined value, circuit means adjustable in accordance with total generation of said sources, circuit means adjustable in accordance with the output of said area-requirement means, a balanceable circuit including said circuit means and including additional circuit elements respectively adjustable in accordance with computed values of generation, computing means having a plurality of summing circuits for producing a plurality of outputs, one for each of said sources, and having a plurality of series-circuits having circuit components, one of them in each said series-circuit being included in each said summing circuit, and each of said series-circuits including an adjustable voltage-varying circuit component, means responsive to unbalance of said balanceable circuit for simultaneously adjusting said voltage-varying components of said computer inputs for varying voltages applied to each said series-circuit for changing said outputs, said outputs being representative of computed values of generation whose sum equals said desired total generation, and means operable with changes in said outputs for adjusting said circuit elements in a direction to rebalance said circuit.

12. A system for controlling the distribution of electrical load among a plurality of power sources interconnected to form a power distribution network, comprising a balanceable circuit unbalanced in accordance with the required total change in generation level of said sources needed to maintain a predetermined network condition, a plurality of computer networks in number corresponding with the number of said sources, means operable during said unbalance for varying simultaneously and by like amounts said inputs to each of said computer networks, means operable in accordance with the outputs of said plurality of computer networks to rebalance said balanceable circuit, and means for varying the generation of said sources in accordance with said outputs whereby said network condition is maintained with a predetermined desirable distribution of said electrical load.

13. In power generating and distributing systems having a plurality of power sources interconnected by transmission lines, the combination of adjustable circuit means, computing networks interconnected by said adjustable circuit means, one for each said source, means for simultaneously adjusting said circuit means in a direction and to an extent indicative of the direction and extent of change of generation of said sources required to maintain a system condition at a predetermined value, one of said computing networks having circuit components relating the computed values of generation and the incremental costs of generation, and the other of said networks relating the computed values of generation and the quantities of unity minus the respective incremental transmission losses, and means operable in accordance with the outputs of said networks for distributing said computed values of generation among said sources with equality of incremental cost of delivered power from each said source.

14. A system for controlling the distribution of electrical load among a plurality of power sources interconnected to form a power distribution network in a manner to maintain a predetermined network condition, comprising a balanceable electrical circuit having at least one adjustable circuit component for producing an electrical unbalance of said circuit in accordance with the required total change in generation level of said sources needed to meet load requirements and to maintain said predetermined network condition, means operable in accordance with said unbalance of said circuit for computing the change required in generation level of said individual sources to maintain the generation levels thereof in predetermined relationship, said balanceable electrical network including adjustable circuit components, one for each said source, for jointly restoring said network to balance in accordance with said computed generation level changes for each said source, and generation control networks, one for each source for comparing actual generation with said computed values of generation for each said source for changing the actual generation of each said source until in correspondence with said computed values of generation for each said source.

15. A system for controlling the distribution of generation required of a plurality of power sources interconnected to form a power distribution network to meet changing generation requirements of said network, comprising generation-responsive means energized in accordance with the generation of said power sources, area-requirement means adjustable with change in a condition of said network for producing an output representative of the change in total generation level required to restore said network condition to a predetermined value, circuit means operable in accordance with said area-requirement means and said generation-responsive means for producing an output representative of the desired total generation of said sources for restoration of said condition to its predetermined value, a balanceable circuit including said circuit means, computing means having a plurality of outputs, one for each of said sources, and having input means adjustable in accordance with the unbalance of said circuit, said computing means having elements operable in response to adjustment of said input means for producing at said plurality of outputs, signals having magnitudes respectively representative of values of generation at said power sources producing equality of the incremental costs of delivered power therefrom with the sum of said values of generation representative of said desired total generation, means operable in accordance with said magnitudes of such signals for rebalancing said circuit, and means for respectively changing the generation of said sources to bring their values of generation equal to those represented by said signals.

16. A system for computing the distribution of generation required of a plurality of power sources interconnected to form a power distribution network to meet changing generation requirements of said network, comprising generation-responsive means operable in accordance with the generation of said power sources, area-requirement means adjustable with change in a condition of said network for producing an output representative of the change in total generation level required to restore said network condition to a predetermined value, circuit means operable in accordance with said area-requirement means and said generation-responsive means for producing an output representative of the desired total generation of said sources for restoration of said condition to its predetermined value, a balanceable circuit including said circuit means, computing means for determining incremental cost of generating power and for determining incremental transmission losses, as a function of generation values, said computing means having a plurality of outputs, one for each of said sources, and having input means adjustable in accordance with unbalance of said circuit, said computing means having elements operable in response to adjustment of said input means for producing at said plurality of outputs signals having magnitudes respectively representative of values of generation at said power sources which produce equality of the incremental costs of delivered power therefrom, and means operable in accordance with said magnitudes of such signals for rebalancing said circuit.

17. In a system for computing the distribution of electrical load among a plurality of power sources interconnected by transmission lines to form a power distribution network, the combination of adjustable circuit components in number corresponding with the power sources to be controlled, means responsive to the difference between a total generation value required to maintain at a predetermined value a network condition and the sum of the desired values of generation as computed for each of said sources for progessively adjusting said circuit components during the existence of said difference, and means responsive to said adjustments of said circuit components for computing said desired values of generation in accordance with a predetermined relationship.

18. In a system for computing the distribution of electrical load among a plurality of power sources interconnected by transmission lines to form a power distribution network, the combination of adjustable circuit components corresponding in number with the power sources to be controlled, means responsive to the difference between the total generation required to maintain at a predetermined value a network condition and the sum of the desired values of generation as computed for each of said sources for progressively adjusting said circuit components during the existence of said differences, and means responsive to said adjustments of said circuit components for computing said desired values of generation for each of said sources to meet said requirement to maintain said network condition at a predetermined value and for equally of incremental cost of delivered power from each of said sources.

19. A system for determining the distribution of generation among a plurality of power sources interconnected to form a power distribution network, comprising computing means having a plurality of components relating the incremental cost of generation for each said source with the computed value of generation of each said source, said computing means including a plurality of additional components for relating the incremental transmission loss for each said source to the computed generation values of all said sources, input-varying means for said computing means representing equality in the incremental costs of delivered power from each of said sources, said computing means having output channels for developing signal outputs representative of computed values of generation at each of said sources, and means for operating said input-varying means in response to deviation of a network condition from a predetermined value until said output signals represent total values of generation adequate to restore said network condition to its said predetermined value.

20. A system for controlling the distribution of generation among a plurality of power sources interconnected to form a power distribution network, comprising computing means having a plurality of components relating the incremental cost of generation for each said source with computed values of generation of each said source, said computing means including a plurality of additional components for relating the incremental transmission loss for each said source to the computed generation values of all said sources, input-varying means for said computing means representing equality in the incremental costs of delivered power from each of said sources, said computing means having output channels for developing signal outputs representative of computed values of generation at each of said sources, means for operating said input-varying means in response to deviation of a network condition from a predetermined value until said output signals represent total values of generation adequate to restore said network condition to its said predetermined value, and means responsive to actual generation of each of said sources and to said computed values of generation for each of said sources for varying the generation in direction for correspondence between actual generation thereof and said computed values of generation.

21. In a computer for a power generating and distribution system having a plurality of power sources interconnected by transmission lines, the combination of adjustable circuit means, one for each of said power sources, computing networks interconnected by said adjustable circuit means, one of said computing networks having circuit components relating an incremental cost of generation for each of said sources to a level of generation and the other of said computing networks relating the quantity unity minus the incremental transmission loss for each of said sources to said level of generation, and means for simultaneously adjusting said circuit means simultaneously to change each said level of generation in direction and to extent for their sum to equal a desired total level of generation with the same incremental cost of the delivered power for each of said sources.

22. A system for determining the distribution of generation among a plurality of power sources interconnected to form a power distribution network, comprising computing means having a plurality of components relating the incremental cost of generation for each said source with a level of generation of each said source, said computing means including a plurality of additional components for relating the incremental transmission loss for each said source to the generation levels of all said sources, input-varying means for said computing means for simultaneously varying the input to said computing means by amounts which maintain equality in the inceremental costs of delivered power from each of said sources, said computing means having output channels for developing signal outputs representative of computed levels of generation at each of said sources with said changed input, and means for operating said input-varying means to change said computed levels of generation until their sum equals a desired total generation level for the system.

23. A computer for determining the distribution of load among a plurality of power sources interconnected by transmission lines, comprising a first computing section for each of said sources having components relating a value of incremental cost of generation to a value of generation corresponding with said incremental cost, a second computing section having components relating the quantity unity minus the incremental transmission loss associated with each of said sources to the corresponding values of generation for said sources, input means operable to maintain equal the ratios between the incremental costs of generation and the quantities unity minus the incremental transmission losses, means for maintaining equal said values of generation as between each of said first computing section and said second computing section with changing values of said ratios, and means for varying said input until the sum of said individual values of generation equals a desired total.

24. The computer as set forth in claim 23, in which said quantity unity minus the incremental transmission loss for each said source is represented by an adjustable potential and in which said means which maintains equal said values of generation comprises a balanceable system in which said adjustable potential is adjusted to maintain said equality between said values of generation as between each said first computing section and said second computing section.

25. The computer as set forth in claim 23, in which said value of generation of each said source associated with said first and said second computer sections is represented by a single potential and in which a balanceable system varies said potential to maintain a corresponding one of said ratios equal to the incremental cost of generation divided by the quantity unity minus the incremental transmission loss for the corresponding one of said sources.

26. In a system for determining the generation level of a plurality of interconnected power sources, the combination of a balanceable electrical circuit having at least one adjustable circuit component for producing electrical unbalance of said circuit in accordance with the required total change in the generation level of said sources needed to maintain said network condition at a predetermined value, computer means operable in accordance with said unbalance of said circuit for producing electrical signals representative of changed levels of generation for each of said sources, each said changed level corresponding with the same value of incremental cost of generation for all said sources, and means operable in accordance with said electrical signals for jointly restoring said network to balance when the sum of the changes in generation levels as computed by said computer means is equal to said required total change in generation level.

27. In a system for determining the levels of generation of a plurality of power sources interconnected to form a power distribution system in manner to maintain a system condition at a predetermined value, the combination of a balanceable electrical circuit having at least one adjustable circuit component for producing an electrical unbalance of said circuit in accordance with the required total change in the generation level of said sources needed to maintain said network condition at said predetermined value, computer means having components relating the incremental cost of generation for each of said sources to generation levels of each of said sources corresponding to said incremental costs, means operable in accordance with said unbalance of said circuit for changing the input of said computer means to represent equal incremental costs of generation for each of said sources corresponding with the changed levels of generation, said balanceable electrical network including adjustable circuit components, one for each of said sources, and means for each of said last-named components operable in accordance with said changed levels of generation for jointly restoring said network to balance.

28. A system for controlling the levels of generation of a plurality of power sources interconnected to form a power distribution system in a manner to maintain a system condition at a predetermined value while meeting the load requirements of said power system, comprising a balanceable electrical circuit having an area-requirement means including one adjustable circuit component for producing an electrical unbalance of said circuit in accordance with the required total change in generation of said sources needed to maintain said system condition at its said predetermined value and to meet said load requirements, and having generation responsive-means energized in accordance with the generation of said power sources which in conjunction with said adjustable circuit component produces in said balanceable circuit an effect representative of the desired total generation of said sources, computing means operable in accordance with said unbalance of said circuit for producing first quantities respectively representing computed levels of generation of each of said sources, said computing means having adjustable circuit means, a computing network having first and second sections interconnected by said adjustable circuit means, and a plurality of components in said first computing section relating the incremental cost of generation for each of said sources with the level of generation for each of said sources, said second section having components including impedance elements in a series-circuit, said second section relating the quantities unity minus the incremental transmission losses for each of said sources to the generation levels of said sources by developing across said impedance elements potential differences representative of components of transmission loss due to the computed levels of generation of said sources, the algebraic sum of said potential differences in each of said series-circuits representing said first quantities, means for operating said adjustable circuit means to maintain equal the ratios between the incremental cost of generation and the quantities unity minus the incremental transmission losses, means for producing second quantities respectively representative of actual generation of said sources, means for maintaining equal said computed levels of generation as between each of said first computing sections and said second computing section with changing values of said ratios, means responsive to both said first and said second quantities for changing the actual generation of each of said sources until it corresponds to its said computed level of generation, and means operable in accordance with said first quantities for rebalancing said electrical circuit when said computed levels of generation meet said load requirements and said total change in generation.

29. A system for controlling the levels of generation required for a plurality of power sources interconnected to form the power distribution network in a manner to maintain a system condition at a predetermined value comprising a balanceable electrical circuit having one adjustable circuit component for producing an electrical unbalance of said circuit in accordance with the required total change in generation of said sources needed to maintain said system condition at its said predetermined value and to meet said load requirements, generation responsive-means energized in accordance with said power sources operatively associated with said adjustable circuit component for producing an output representative of the desired total generation of said sources, computing means operable in accordance with said unbalance of said circuit for producing electrical signals as output quantities respectively representative of changed levels of generation for each of said sources, each said changed level corresponding with the same value of incremental cost of generation for all said sources, means responsive to said electrical signals for changing the actual generation of the said sources until each corresponds to its said computed level of generation, and means operable in accordance with said output quantities for rebalancing said electrical circuit when said computed levels of generation equal said desired total change in generation.

30. A computer for determining the desired change in generation of a power source comprising a first computing section having components relating a value of generation to a first quantity representing a corresponding value of incremental cost of generation, a second computing section having components relating a value of generation to a second quantity representing a corresponding value of the quantity unity minus the incremental transmission loss associated with said source, input means having components operable by adjustment to relate values representing the incremental cost of generation and the quantity unity minus the incremental transmission loss in a desired ratio, means connecting said computer sections and said input means to form a loop with the quantities related by said input means being in corresponding positions in the loop with those of like nature related by said first and second computer sections, a source of supply in said loop for applying at one point thereof a value in magnitude representative of one of said quantities for developing at other points along said loop the other of said quantities, means for detecting at a point in said loop the unbalance resulting from lack of correspondence of like quantities as developed by the components of said computing sections and said input means to determine the desired direction of change in computed generation.

31. A computer for determining the desired output of a generating unit in order to have it operating at a set level of incremental cost of delivered power comprising means for producing from a signal representing the desired generation of the generating units a first signal indicative of the corresponding magnitude of the incremental cost of generation for said unit, means for producing from said first signal in accordance with the ratio represented by said set level a second signal indicative of the corresponding value of the quantity unity minus the incremental transmission loss associated with said unit, means for producing from said second signal another signal representing the desired generation of said unit, and means responsive to the difference between said last named signal and said first named signal each representing the desired generation of the generating unit to alter the value of said first named signal in sense and to extent to reduce said difference substantially to zero whereby said desired output is determined.

32. A computer for determining the desired output of a generating unit in order to have it operating at a set level of incremental cost of delivered power comprising means for producing in accordance with said set level, a first signal indicative of a corresponding magnitude of the incremental cost of generation for said unit and a second signal related to said first signal by the magnitude of said set level and indicative of a corresponding value of the quantity unity minus the incremental transmission loss associated with said unit, means for producing from said first signal a corresponding signal representing the desired generation of said generating unit, means for producing from said second signal another signal representing the desired generation of said generating unit, and means responsive to the difference between the signal produced from said first signal and the signal produced from said second signal operable to alter in sense and extent the magnitude of said first and second signals simultaneously without affecting their said relationship to reduce said difference substantially to zero, whereby the desired output is determined.

33. A computer for determining the desired output of a generating unit in order to have it operating at a set level of incremental cost of delivered power comprising means for producing from a signal representing the desired generation of the generating unit a first signal indicative of the corresponding magnitude of the incremental cost of generation for said unit and a second signal indicative of a corresponding value of the quantity unity minus the incremental transmission loss associated with said unit, means for setting said incremental cost of delivered power as a desired ratio between said first and second signals, and means responsive to the difference between the existing relation as determined by said first and second signals and the set relation to alter in sense and extent the value of said signal representing the desired generation as produced by said first named means to reduce said difference substantially to zero, whereby the desired output is determined.

34. A power system computer comprising a first computing section having components relating a value of generation to a first quantity representing a function of the input to a source of generation, a second computing section having components relating a value of generation to a second quantity representing a function of the transmission losses associated with said source, input means having components operable in accordance with an adjusted value to relate quantities like said first and second quantities in their desired relationship as determined by said adjusted value, means connecting said computer sections and said input means to form a loop with the quantities related by said input means being in corresponding positions in the loop with those of like nature related by said first and second computer sections and a source of energizing said loop to establish the magnitudes of the quantities in said loop in accordance with the relationship set up by said first and second computing sections and said input means.

References Cited in the file of this patent

UNITED STATES PATENTS

| | | |
|---|---|---|
| 2,010,594 | Kerr | Aug. 6, 1935 |
| 2,039,426 | Kerr | May 5, 1936 |
| 2,050,338 | Kerr | Aug. 11, 1936 |
| 2,113,164 | Williams | Apr. 5, 1938 |
| 2,366,968 | Kaufman | Jan. 9, 1945 |
| 2,367,746 | Williams | Jan. 23, 1945 |
| 2,656,977 | Cummings | Oct. 27, 1953 |
| 2,688,728 | Carolus | Sept. 7, 1954 |

FOREIGN PATENTS

| | | |
|---|---|---|
| 1,083,932 | France | Sept. 23, 1953 |

OTHER REFERENCES

George et al.: "Cordination of Fuel Cost and Transmission loss by Use of the Network Analyzer To Determine Plant Loading Schedules," AIEE Technical Paper 49–242, September 1949, 23 pages.

Baldini et al.: "A Power System Analog and Network Computer," AIEE Technical Paper 52–62, December 1951, 11 pages.

Electric Analog Computing (Mynall), "Electronic Engineering," June 1947, pages 178 to 180.

"Electronic Instruments" (Greenwood, Holdam and McRae), published by McGraw-Hill Book Co., New York, 1948, page 36.

Article by Kirchmayer and McDaniel from "General Electric Review" for October 1951, pages 39 to 54.

"Electronic Analog Computers" (Korn and Korn), published by McGraw-Hill Book Co., New York, 1952, page 254.

"Area-Wide Generation Control," by Nathan Cohn (from "Electric Light and Power" June–July–August 1953).

UNITED STATES PATENT OFFICE
Certificate of Correction

Patent No. 2,836,731                                May 27, 1958

William G. Miller, Jr.

It is hereby certified that error appears in the printed specification of the above numbered patent requiring correction and that the said Letters Patent should read as corrected below.

Column 4, lines 55 to 57 inclusive, Equation 10, for $$+K_{mn}\frac{\partial P_L}{\partial P_L} \quad \text{read} \quad +K_{mn}\frac{\partial P_L}{\partial P_n}$$

column 19, line 19, for "diivded" read —divided—; line 69, for "volue" read —value—; column 26, line 60, for "sources 1" read —source 1—; column 27, line 14, for "repersented" read —represented—; column 32, line 67, claim 18, for "equally" read —equality—; column 34, line 28, claim 25, for "of", second occurrence, read —for—; column 36, line 55, claim 32, strike out the comma after "level"; column 37, line 32, claim 34, for "source of" read —source for—.

Signed and sealed this 3rd day of November 1959.

[SEAL]

Attest:
KARL H. AXLINE,
*Attesting Officer.*

ROBERT C. WATSON,
*Commissioner of Patents.*